(12) United States Patent
Sigurjonsson et al.

(10) Patent No.: US 12,478,583 B2
(45) Date of Patent: Nov. 25, 2025

(54) ANTIMICROBIAL SOLUTIONS AND METHODS OF USING THE SAME IN THE TREATMENT OR PREVENTION OF INFECTIONS

(71) Applicant: KERECIS AG, Adliswil (CH)

(72) Inventors: Gudmundur Fertram Sigurjonsson, Adliswil (CH); Dora Hlin Gisladottir, Adliswil (CH); Jon Magnus Kristjansson, Adliswil (CH)

( * ) Notice: Subject to any disclaimer, the term of this patent is extended or adjusted under 35 U.S.C. 154(b) by 203 days.

(21) Appl. No.: 17/209,807

(22) Filed: Mar. 23, 2021

(65) Prior Publication Data

US 2021/0290533 A1    Sep. 23, 2021

Related U.S. Application Data

(60) Provisional application No. 63/091,177, filed on Oct. 13, 2020, provisional application No. 63/040,807, filed on Jun. 18, 2020, provisional application No. 63/004,467, filed on Apr. 2, 2020, provisional application No. 63/003,887, filed on Apr. 1, 2020, provisional application No. 62/993,360, filed on Mar. 23, 2020, provisional application No. 62/993,201, filed on Mar. 23, 2020, provisional application No. 62/993,356, filed on Mar. 23, 2020.

(51) Int. Cl.
| | |
|---|---|
| *A61K 9/08* | (2006.01) |
| *A61K 9/00* | (2006.01) |
| *A61K 31/122* | (2006.01) |
| *A61K 31/155* | (2006.01) |
| *A61K 31/731* | (2006.01) |
| *A61K 36/38* | (2006.01) |
| *A61K 36/58* | (2006.01) |
| *A61K 47/10* | (2017.01) |

(52) U.S. Cl.
CPC .............. *A61K 9/08* (2013.01); *A61K 9/006* (2013.01); *A61K 31/122* (2013.01); *A61K 31/155* (2013.01); *A61K 31/731* (2013.01); *A61K 36/38* (2013.01); *A61K 36/58* (2013.01); *A61K 47/10* (2013.01)

(58) Field of Classification Search
CPC ........ A61K 9/08; A61K 9/006; A61K 31/122; A61K 31/155; A61K 31/731; A61K 36/38; A61K 36/58; A61K 47/10; A61K 47/186; A61K 9/0043; A61K 9/0095; A61K 47/14; A61K 47/22; A61K 47/26; A61P 31/14

See application file for complete search history.

(56) References Cited

U.S. PATENT DOCUMENTS

| | | | |
|---|---|---|---|
| 6,579,543 B1 | 6/2003 | McClung | |
| 7,691,418 B2 | 4/2010 | Rossel | |
| 8,211,481 B2 | 7/2012 | Mosconi | |
| 8,846,114 B1 | 9/2014 | Makela et al. | |
| 10,293,011 B2 | 5/2019 | Carnevali et al. | |
| 2006/0264497 A1 | 11/2006 | Zeligs | |
| 2007/0104661 A1 | 5/2007 | Bombardelli | |
| 2008/0206161 A1 | 8/2008 | Tamarkin et al. | |
| 2008/0233145 A1* | 9/2008 | Schempp | A61K 9/06 514/468 |
| 2008/0305179 A1* | 12/2008 | Carnevali | A61K 36/58 424/537 |
| 2010/0189823 A1 | 7/2010 | Mosconi | |
| 2013/0209534 A1 | 8/2013 | Gualandi et al. | |
| 2016/0263167 A1 | 9/2016 | Wiriyachitra | |
| 2017/0071198 A1 | 3/2017 | Neigel | |
| 2017/0107503 A1 | 4/2017 | Clarsund et al. | |
| 2017/0181970 A1 | 6/2017 | Tamarkin et al. | |
| 2019/0054011 A1* | 2/2019 | Shah | A61K 36/53 |
| 2019/0216872 A1 | 7/2019 | Jimenez del Rio et al. | |
| 2019/0224262 A1 | 7/2019 | Carnevali et al. | |
| 2019/0231836 A1 | 8/2019 | Langland et al. | |
| 2020/0002377 A1* | 1/2020 | Van Den Nest | A61P 37/08 |

FOREIGN PATENT DOCUMENTS

| | | |
|---|---|---|
| CN | 101744794 A | 6/2010 |
| CN | 101744798 A | 6/2010 |
| CN | 106727907 A | 5/2017 |
| CN | 109381595 A | 2/2019 |
| EP | 2635266 A1 | 9/2013 |
| JP | 2000044419 A | 2/2000 |
| WO | 2017212422 A1 | 12/2017 |
| WO | 2018138292 A1 | 8/2018 |
| WO | 2019046664 A1 | 3/2019 |

OTHER PUBLICATIONS

CN109172556A Machine English translation (Year: 2019).*
Lauchli et al., "A Plant-Derived Wound Therapeutic for Cost-Effective Treatment of Post-Surgical Scalp Wounds with Exposed Bone," Karger, vol. 21, Mar. 17, 2014, pp. 88-93.
Saddiqe et al., "A Review of the Antibacterial of *Hypericum perforatum* L.," Journal of Ethnopharmacology, vol. 131, Jul. 24, 2010, pp. 511-521.
"All about Neem," New Directions Aromatics Blog, Sep. 26, 2017, 11 Pages.
Mainetti et al., "An Experience with Paediatric Burn Wounds Treated with a Plant-Derived Wound Therapeutic," Journal of Wound Care, vol. 22, No. 12, Dec. 31, 2013, 7 Pages.
Desbois et al., "Antibacterial Free Fatty Acids: Activities, Mechanisms of Action and Biotechnological Potential," Applied Microbiol Biotechnology, vol. 85, Dec. 3, 2009, pp. 1629-1642.

(Continued)

*Primary Examiner* — Robert A Wax
*Assistant Examiner* — Quanglong N Truong

(57) ABSTRACT

Antimicrobial compositions include a therapeutically effective amount of neem oil, extract of the plant *Hypericum* spp., polyunsaturated fatty acids (PUFAs), carrageenans, and/or chlorhexidine; and (optionally) in combination with one or more pharmaceutically acceptable carriers, additives, and/or diluents. The antimicrobial compositions are effective in treating or preventing upper respiratory tract infections, preferably upper respiratory tract infections caused by human Coronaviruses and are included within methods of treating or preventing infection of the upper respiratory tract of humans by a microbial pathogen.

34 Claims, 6 Drawing Sheets

(56) References Cited

OTHER PUBLICATIONS

Arab-Tehrany et al., "Beneficial Effects and Oxidative Stability of Omega-3 Long-Chain Polyunsaturated Fatty Acids," Trends in Food Science & Technology, vol. 25, Dec. 31, 2011, pp. 24-33.

"Dr. Brite Breath Freshener Berrylicious Natural Mouth Spray with Vitamin C," accessed https://www.amazon.com/Dr-Brite-Berrylicious-Nourishing-Ingredients/dp/B074VP6X6M on Apr. 7, 2021, 7 Pages.

Lauchli et al., "Combination of St. John's Wort Oil and neem Oil Promotes healing of Scalp Wounds," American Botanical Council, Oct. 31, 2012, 2 Pages.

Botelho et al., "Efficacy of a Mouthrinse Based on Leaves of the Neem Tree (*Azadirachta indica*) in the Treatment of Patients with Chronic Gingivitis: A Double-Blind, Randomized, Controlled Trial," Journal of Medicinal Plants Research, vol. 2, No. 11, Nov. 21, 2008, pp. 341-346.

McClements et al., "Encapsulation Technologies and Delivery Systems for Food Ingredients and Nutraceuticals," Woodhead Publishing Limited, 1st Edition, Oct. 19, 2012, pp. 30-36.

Clarsund et al., "Evaluation of ColdZyme Mouth Spray on Prevention of Upper Respiratory Tract Infections in a Boy with Primary Immunodeficiency: A Case Report," Journal of medical Case Reports, vol. 10, Issue 302, Oct. 31, 2016, pp. 1-5.

"Hypericum Oil and Neem Oil," Flordis, retrieved from https://www.flordis.co.za/ingredients/hypericum-oil-and-neem-oil/ on Apr. 7, 2021, 6 Pages.

"100% Natural and Highly Effective Wound Dressing "1" Finds Widespread Use in the Treatment of Acute and Chronic Wounds," Phytoceuticals Ltd., Jun. 23, 2011, 2 Pages.

"Healing Herpes Naturally," Local Harvest, Oct. 18, 2012, 2 Pages.

Zhang et al., "How to Stabilize #-3 Polyunsaturated Fatty Acids (PUFAs) in an Animal Feeding Study?—Effects of Temperature, Oxygen Level, Antioxidant on Oxidative Stability of #-3 PUFAs in a Mouse Diet," Journal of Agricultural and Food Chemistry, Mar. 23, 2020, 30 Pages.

"Neem and Hypericum," Hypermix, retrieved from https://www.hypermix.it/en/what-is/neem-and-hypericum at least by Apr. 9, 2021, 6 Pages.

"Neem and Hypericum," Hyperoil, retrieved from https://hyperoil.com/neem-hypericum/ on Apr. 7, 2021, 4 Pages.

Hammer et al., "Inhibition of Prostaglandin E2 Production by Anti-Inflammatory Hypericum perforatum Extracts and Consituents in RAW264.7 Mouse Macrophage Cells, Journal of Agricultural and Food Chemistry, vol. 55, Aug. 15, 2007, pp. 7323-7331.

Raposo et al., "Intake of Vitamin C, Vitamin E, Selenium, Zinc and Polyunsaturated Fatty Acids and Upper Respiratory Tract Infection—A Prospective Cohort Study," European Journal of Clinical Nutrition, vol. 71, Jan. 11, 2017, pp. 450-457.

"Interview with Mischa Wiegand, MD," OneSpray, retrieved from https://onespray.co.uk/scar-care on Apr. 7, 2021, 2 Pages.

Kumar et al., "Neem (*Azadirachta indica*): Prehistory to Contemporary Medicinal Uses to Humankind," Asian Pacific Journal of Tropical Biomedicine, vol. 3, No. 7, Jul. 28, 2013, pp. 505-514.

"Neem Oil 'Shingle Relief' Skin Cream with Hemp and Myrrh," retrieved from https://allaboutneem.com/neem-oil-shingle-relief-skin-cream-with-hemp-and-myrrh/ on Apr. 7, 2021, 6 Pages.

Colonia et al., "Omega-3 Microbial Oils from Marine Thraustochytrids as a Sustainable and Technological Solution: A Review and patent Landscape," Trends in Food Science & Technology, vol. 99, Mar. 13, 2020, pp. 244-256.

Lemoine Soto et al., "Omega-3 Fatty Acid Intake and Prevalent Respiratory Symptoms amond U.S. Adults with COPD," BMC Pulmonary Medicine, vol. 19, Issue 1, May 21, 2019, 7 Pages.

"Kerecis: News," Phytoceuticals Ltd., retrieved from kerecis.com at least by Apr. 9, 2021, 7 Pages.

"Plant-Based Omega-3 Spray," Ora Organic, retrieved from https://www.ora.organic/ at least by Apr. 9, 2021, 5 Pages.

Lauchli et al., "Post-Surgical Salp Wounds with Exposed Bone Treated with a Plant-Derived Wound Therapeutic," Journal of Wound Care, vol. 21, No. 5, May 31, 2012, 5 Pages.

Kello et al., "PUFAs Enhance Oxidative Stress and Apoptosis in Tumour Cells Exposed to Hypericin-Mediated PDT," Photochemical & Photobiological Sciences, vol. 9, Aug. 12, 2010, pp. 1244-1251.

Van Der Esch, "Role of Neem in Animal Health," World Neem Conference, Nov. 21, 2012, 10 Pages.

Jacobsen, "Some Strategies for the Stabilization of Long Chain N-3 PUFA-Enriched Foods: A Review," European Journal of Lipid Science and Technology, vol. 117, Sep. 17, 2015, pp. 1853-1866.

"Spray Me—All Natural and Effective Dental Spray," Guild of Shepherds and Collies, retrieved from https://guildofshepherdsandcollies.com/product/spray-me-all-natural-and-effective-dental-spray/ on Apr. 7, 2021, 2 Pages.

"St John's Wort, Marigold & Propolis Spray," The Organic Pharmacy, retrieved from https://www.thetot.com/product/organic-pharmacy-st-johns-wort-marigold-propolis-spray/ on Apr. 7, 2021, 6 Pages.

Kaveh et al., "The Effect of Alpha Linolenic Acid on Tracheal Responsiveness, Lung Inflammation, and Immune Markers in Sensitized Rats," Iranian Journal of Basic Medical Sciences, Nov. 19, 2018, 8 Pages.

Wolfle et al., "Topical Application of St. John's Wort (Hypericum perforatum)," Planta Medica, vol. 80, Sep. 27, 2013, 14 Pages.

"What is Hyperoil?" Hyperoil, retrieved from www.holoilsystem.com at least by Apr. 9, 2021, 3 Pages.

"History," Hyperoil, retrieved from https://hyperoil.com/history/ at least by Apr. 9, 2021, 4 Pages.

Mustafa, "Antibacterial Efficacy of Neem (*Azadirachta indica*) Extract Against Enterococcus faecalis: An in vitro Study," The Journal of Contemporary Dental Practice, vol. 17, No. 10, Oct. 31, 2016, pp. 791-794.

Suntar et al., "Antimicrobial Effect of the Extracts from Hypericum perforatum Against Oral Bacteria and Biofilm Formation," Pharmaceutical Biology, vol. 54, No. 6, Oct. 29, 2015, pp. 1065-1070.

Rahimi et al., "Chemical Compound and Therapeutic Effects of Hypericum perforatum," Der Pharmacia Lettre, Jan. 31, 2016, vol. 8, No. 9, 6 pp. 237-241.

Mirandola et al., "Holoil: Dispositivo Medico Classe IIb Solo Per Uso utaneo Formulazione Gel," retrieved from https://shop.holoil.it/prodotti/holoil-medicazione-flacone-gel-spray-100ml, Mar. 13, 2019, 2 Pages.

Franco et al., "Hypericum perforatum and Neem Oil for the Management of Acute Skin Toxicity in Head and Neck Cancer Patients Undergoing Radiation or Chemo-Radiation: A Single-Arm Prospective Observational Study," Radiation Oncology, vol. 9, No. 297, at least by Dec. 31, 2014, 8 Pages.

Barnaulov et al., "Medicinal Botanicals in the Traditional Medicine of the Veps Used for Bronchial Infections," Current Traditional Medicine, vol. 4, No. 2, Mar. 14, 2018, pp. 101-109.

Parida et al., "The Natural Way Forward: Molecular Dynamics Simulation Analysis of Phytochemicals from Indian Medicinal Plants as Potential Inhibitors of SARS-CoV-2 Targets," Phytotherapy Research, vol. 34, Aug. 22, 2020, pp. 3420-3433.

"The Pharmacological Potential of Plant Compounds and Preparations in COVID-19: A PTR Virtual Issue," Phytotherapy Research, vol. 35, Nov. 9, 2020, pp. 1683-1685.

"Viruxal Oral and Nasal Spray for Treating the Symptoms of COVID-19 (KONS-COVID19)," retrieved from the U.S. National Library of Medicine clinicaltrials.gov at least by Sep. 17, 2020, 8 Pages.

International Search Report and Written Opinion from PCT Application No. PCT/IB2021/052408, Jun. 21, 2021.

Russian Search Report from corresponding RU Application No. 2022126556, Dec. 20, 2023.

Dresler, S., et al. Methodological aspects of biologically active compounds quantification in the genus Hypericum. Journal of Pharmaceutical and Biomedical Analysis 155 (2018) 82-90.

Hypericum. Royal Botanic Gardens, Kew. Page saved Nov. 1, 2020. Found on the Internet: https://web.archive.org/web/20200111110805/https://powo.science.kew.org/taxon/urn:lsid:ipni.org:names:30002180-2/.

(56) References Cited

OTHER PUBLICATIONS

St. John's wort. MSD Handbook. Professional version. Page saved Feb. 9, 2019. Found on the Internet: https://www.msdmanuals.com/home/multimedia/table/some-drug-interactions-with-st-johns-wort.
Russian Office Action from corresponding RU Application No. 2022126556, Dec. 20, 2023.
Zhang, Yuqun, "Study on the Antibacterial Activity of Neem oil in Vitro and the Isolation, Purification and Identification of Antibacterial Active Component from Neem Oil", Chinese Master's Theses Full-text Database, Medicine and Health Sciences, Apr. 15, 2011.
Office Action from Chinese Patent Application No. CN202180023306.7, Jul. 23, 2023.
Chen et al., "Antiviral Activity Against Infectious Bronchitis Virus and Bioactive Components of *Hypericum perforatum* L.", Frontiers in Pharmacology, Oct. 29, 2019, pp. 1-22, Article 1272.
Japanese Office Action from Corresponding Japanese Patent Application No. 2022-558333, Sep. 29, 2023.
Sandanasamy, Jessinta et al., "Fatty Acid Composition and Antibacterial Activity of Neem (*Azadirachta indica*) Seed Oil", The Open Conference Proceedings Journal, Dec. 27, 2013, pp. 43-48, vol. 4.
Emirati Office Action from United Arab Emirates Patent Application No. P6001852/2022, Oct. 8, 2024.
Chanda, Warren et al., "Effectiveness of omega-3 polyunsaturated fatty acids against microbial pathogens", Journal of Zhejiang University-SCIENCE B (Biomed & Biotechnol), Apr. 20, 2018, pp. 253-262, vol. 19.
Dresler, Slawomir et al., "Methodological aspects of biologically active compounds quantification in the genus Hypericum", Journal of Pharmaceutical and Biomedical Analysis, Mar. 28, 2018, pp. 82-90, vol. 155.
Piran, Parizad et al., "Formulation of Menthol-Loaded Nanostructured Lipid Carriers to Enhance Its Antimicrobial Activity for Food Preservation", Advanced Pharmaceutical Bulletin, Jun. 30, 2017, pp. 261-268, vol. 7.
Russell et al., "Antibacterial activity of chlorhexidine", Journal of Hospital Infection, as early as Dec. 1, 1993, pp. 229-238, vol. 25, Issue 4.
Shafaghat, Ali, "Antioxidant, Antimicrobial Activities and Fatty Acid Components of Flower, Leaf, Stem and Seed of Hypericum scabrum", Natural Product Communications, as early as Nov. 1, 2011, pp. 1739-1742, vol. 6, No. 11.
Tusevski, Oliver et al., "Production of phenolic compounds, antioxidant and antimicrobial activities in hairy root and shoot cultures of *Hypericum perforatum* L.", Plant Cell, Tissue and Organ Culture, Nov. 25, 2016, pp. 589-605, vol. 128, No. 3.
Russian Office Action from Corresponding Russian Patent Application No. RU2022126556/04, Oct. 4, 2024.
Holoil, "Holoi: Medicazione vegetale multifunzionale" (English: "Holoil: Multifunctional herbal dressing"), as early as Nov. 1, 2019, 11 pages, retrieved from <https://rimos.com/wp-content/uploads/2019/12/Catalogo-Holoil_NOV_2019_WEB2.pdf> on May 28, 2025.
Korean Office Action from Corresponding Korean Patent Application No. KR10-2022-7035972, Apr. 18, 2025.
Singaporean Office Action from Corresponding Singaporean Patent Application No. SG11202252698J, Apr. 8, 2025.

\* cited by examiner

Effect of Antimicrobial Solution on Coronavirus

FIG. 3

Effect of Antimicrobial Solution on Coronavirus Titers

ANTIMICROBIAL SOLUTIONS AND METHODS OF USING THE SAME IN THE TREATMENT OR PREVENTION OF INFECTIONS

BACKGROUND

Technical Field

This disclosure generally relates to antimicrobial solutions. More specifically, the present disclosure relates to antimicrobial solutions and methods of treating or preventing infections by microbial pathogens.

Related Technology

Infections can be caused by a number of different microbes. Viruses are one of the most common pathogenic microbes in humans, and there is a tremendous amount of diversity in the number and kind of viruses causative of disease states in humans. Most viral diseases are self-limiting and do not cause any long-term morbidity to the host and do not require special treatment aside from antipyretics and proper fluid intake.

Specific treatments for viral infections are available for a narrow subset of viruses, including herpes simplex viruses and HIV, but most viral infections only have symptomatic treatments available or antiviral medications that aim to reduce the number of sick days, such as Ozeltamavir for influenza.

The most common and effective strategy for the prevention and/or treatment of viral infections is with immunizations. However, immunizations are available for only a few types of viruses. This is due, in part, to the constantly evolving nature of many pathogenic viruses. Many viruses undergo a form of antigenic drift, making it difficult to identify and target a conserved epitope for immunization therapies.

Upper respiratory tract infections in humans are predominantly caused by viral infections. Common pathogenic viruses include the influenza virus, respiratory syncytial virus, parainfluenza virus, adenovirus, rhinovirus, human metapneumovirus, and enterovirus, as well as the family of Coronaviruses that cause the common cold. FIG. 1, for example, illustrates the complex viral etiology of the common cold. Some viruses, such as the Coronavirus family, have the added risk of evolving tropism for humans, thereby transforming into an often highly infective human pathogen such as MERS-CoV, the causative agent of the Middle East Respiratory Syndrome, SARS-CoV-1, the causative agent of Severe Acute Respiratory Syndrome, and SARS-CoV-2, the causative agent of the COVID-19 pandemic.

Every year, new or evolved strains of pathogenic viruses cause worldwide outbreaks of respiratory diseases, which represent a leading cause of global morbidity and mortality. An estimated 5-10% of adults and 20-30% of children are infected with influenza each year, resulting in 3-5 million cases of severe disease and approximately 1 million deaths worldwide. Abnormal viral outbreaks such as those caused by the SARS-CoV1 and SARS-CoV2 Coronaviruses have the potential to cause substantially higher morbidity and mortality rates than influenza.

In addition to influenza and the novel coronavirus, acute viral respiratory tract infection, also known as the common cold, is the most frequently observed infection disease in humans, with children contracting, on average, four to eight upper respiratory infections per year and adults contracting, on average, two to four episodes per year. In the majority of cases, the common cold is caused by respiratory viruses such as rhinoviruses, coronaviruses, parainfluenza, influenza, respiratory syncytial viruses, adenoviruses, enteroviruses, and metapneumoviruses.

Although the common cold is considered a "self-limiting disease," with the symptoms, including runny nose, nasal congestion, sneezing, cough, sore throat, general malaise, and fever, the symptoms are troublesome and uncomfortable, with more than 20 million doctor visits and 40 million lost school and work days per year. This incurs a massive global economic and social burden with no effective treatments.

An additional problem is the challenge in providing an antiviral composition that is effective against both enveloped viruses (those comprising lipid-bilayer membranes that enter host cells by membrane fusion, including such viruses as herpesviruses, poxviruses, hepadnaviruses, coronaviruses, retroviruses, and others) and non-enveloped viruses (those lacking a lipid-bilayer membrane that enter host cells by some form of membrane perforation, including such viruses as rotaviruses, polioviruses, and others).

Unfortunately, there are currently no effective solutions for the treatment or prevention of many viral infections, including upper respiratory tract infections caused by Coronaviruses, particularly SARS-CoV-1 and/or SARS-CoV-2, influenza, and the common cold, among others. As such, there are a number of disadvantages with antimicrobial compositions and methods for treating or preventing microbial infections that can be addressed.

BRIEF SUMMARY

Embodiments of the present disclosure solve one or more of the foregoing or other problems in the art with antimicrobial solutions. An effective treatment to upper respiratory infections, such as those caused by the novel coronavirus, influenza, and the common cold, must account for the fact that humans are infected by numerous different viruses. Embodiments of the present disclosure advantageously exhibit broad antiviral capacity and do not lead to resistance formation.

In particular, one or more embodiments can include antimicrobial solutions having a therapeutically effective amount of neem oil and extract of the plant *Hypericum* spp.; (optionally) in combination with one or more pharmaceutically acceptable carriers, additives, and/or diluents. In other embodiments, the antimicrobial solutions may have a therapeutically effective amount of polyunsaturated fatty acids (PUFAs), neem oil, and extract of the plant *Hypericum* spp.; (optionally) in combination with one or more pharmaceutically acceptable carriers, additives, and/or diluents. In yet other embodiments the antimicrobial solutions can include antimicrobial solutions having a therapeutically effective amount of polyunsaturated fatty acids (PUFAs) (optionally) in combination with one or more pharmaceutically acceptable carriers, additives, and/or diluents.

The disclosed antimicrobial solutions are effective in treating or preventing infections caused by bacterial or viral pathogens, preferably upper respiratory tract infections caused by human coronaviruses, and are included within methods disclosed herein of treating or preventing infection of the upper respiratory tract of humans by a microbial pathogen.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which:

FIG. 3 is a bar graph illustrating the concentration of Coronavirus virions when treating with (i) carrier alone; (ii) carrier plus one of polyunsaturated fatty acids (PUFAs), neem oil, and extract of the plant *Hypericum* spp.; (iii) carrier plus two of polyunsaturated fatty acids (PUFAs), neem oil, and extract of the plant *Hypericum* spp.; and (iv) an antimicrobial solution according to one or more embodiments of the present disclosure that includes a carrier plus therapeutically effective amounts of PUFAs, neem oil, and extract of the plant *Hypericum* spp.

FIG. 4 is a graph illustrating the effect of (i) carrier alone; (ii) carrier plus one of polyunsaturated fatty acids (PUFAs), neem oil, and extract of the plant *Hypericum* spp.; (iii) carrier plus two of polyunsaturated fatty acids (PUFAs), neem oil, and extract of the plant *Hypericum* spp.; and (iv) an antimicrobial solution according to one or more embodiments of the present disclosure that includes a carrier plus therapeutically effective amounts of PUFAs, neem oil, and extract of the plant *Hypericum* spp. on the titer of Coronavirus in a human patient over time.

FIG. 5 is a graph illustrating the number and/or severity of symptoms associated with an upper respiratory tract viral infection left untreated or treated with an antimicrobial solution according to one or more embodiments of the present disclosure that includes a carrier plus therapeutically effective amounts of PUFAs, neem oil, and extract of the plant *Hypericum* spp. The dashed line indicates when treatment was given to the patient (i.e., following presentation of symptoms).

FIG. 6 is a bar graph illustrating the concentration of Coronavirus virions when treating with (i) a control solution having only an oxidative stabilizer and a carrier; (ii) polyunsaturated fatty acids (PUFAs) alone; (iii) PUFAs with an oxidative stabilizer; and (iv) PUFAs plus an oxidative stabilizer and a carrier according to one or more embodiments of the present disclosure.

FIG. 7 is a graph illustrating the results of a human subject test of an antimicrobial solution according to an embodiment.

FIG. 8 is a diagram illustrating an ongoing human subject study using antimicrobial solutions according to an embodiment.

FIG. 9 is a graph illustrating preliminary results of the ongoing human subject test of FIG. 8.

FIG. 10 is a diagram illustrating a planned animal subject study using antimicrobial solutions according to an embodiment.

FIG. 11 is a diagram illustrating a planned human subject study using antimicrobial solutions according to an embodiment.

DETAILED DESCRIPTION

A better understanding of different embodiments of the disclosure may be had from the following description read with the accompanying drawings in which like reference characters refer to like elements.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Figure 1:
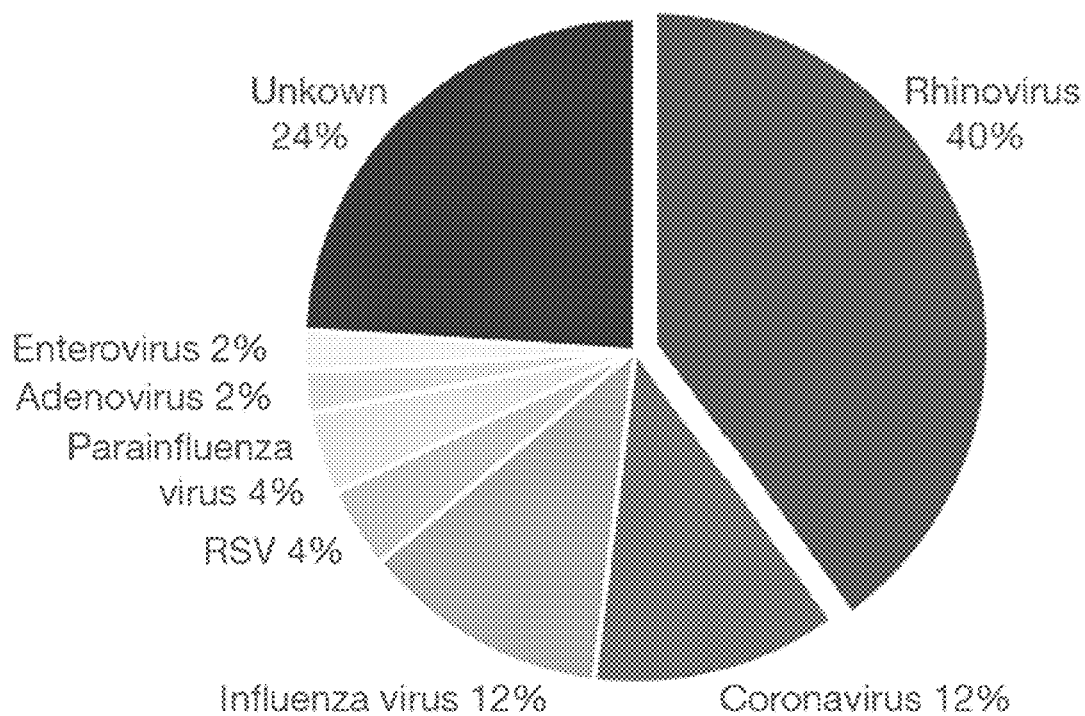
FIG. 1 is a pie chart illustrating the proportion of colds caused by particular viruses.

While the disclosure is susceptible to various modifications and alternative constructions, certain illustrative embodiments are in the drawings described below. It should be understood, however, there is no intention to limit the disclosure to the specific embodiments disclosed, but on the contrary, the intention covers all modifications, alternative constructions, combinations, and equivalents falling within the spirit and scope of the disclosure.

Any headings and subheadings used herein are for organizational purposes only and are not meant to be used to limit the scope of the description or the claims.

It will be understood that unless a term is expressly defined in this application to possess a described meaning, there is no intent to limit the meaning of such term, either expressly or indirectly, beyond its plain or ordinary meaning.

Any element in a claim that does not explicitly state "means for" performing a specified function, or "step for" performing a specific function is not to be interpreted as a "means" or "step" clause as specified in 35 U.S.C. § 112.

Virustatic and Antibacterial Properties of PUFAs

PUFAs, such as the omega-3 fatty acids arachidonic acid (AA), alpha-linolenic acid (ALA), eicosapentaenoic acid (EPA), and docosahexaenoic acid (DHA), are known to have minor bacteriostatic and virustatic properties. For example, EPA has been shown to have antimicrobial activity against some Gram-positive (e.g., *Bacillus subtilis, Listeria monocytogenes*, and *Staphylococcus aureus*) and Gram-negative (e.g., *Pseudomonas aeruginosa*) bacteria, species of Mycobacteria, various fungi, Cyanobacteria, Microalgae, Protozoans, and select viruses.

In particular, EPA has been shown to be effective at inhibiting the growth of important foodborne pathogens, including three Gram-positive species (*Bacillus subtilis, Listeria monocytogenes*, and *Staphylococcus aureus*) and the Gram-negative *Pseudomonas aeruginosa*. EPA has been shown to be effective against methicillin-resistant strains of *S. aureus*, which are a major cause of patient mortality in healthcare institutions across the world. Additionally, EPA showed potency against the etiological agent of peptic ulcers, *Helicobacter pylori*, and abolished the growth of this pathogen when provided at certain concentrations. EPA has also demonstrated potent antibacterial activity against oral human pathogens like *Streptococcus mutans*.

Several PUFAs, including AA, DHA, and EPA, have been shown to inhibit the growth of chronic hepatitis C, and incubation of PUFAs demonstrated reduced infectivity of several enveloped viruses, including Myxovirus, Paramyxovirus, Arbovirus, and Herpesvirus. However, given the diversity of microbes, there has been mixed success in demonstrating efficacy of PUFAs as broad-spectrum antiviral/antibacterial compounds.

Providing an increased concentration of omega-3 PUFAs to a commercial wound healing scaffold derived from fish skin-which itself maintains a portion of the naturally occurring omega-3 fatty acids—has been shown to perform as a bacterial barrier for 80% longer than non-spiked product.

Nevertheless, while PUF As have some success as an antimicrobial compound, they have not been shown—and are not expected to—function as a broad-spectrum antimicrobial barrier, particularly within the oral mucosa, on their own. Further, many of the PUFAs are prone to oxidation, which causes an offensive taste and smell. This makes their inclusion in an oral or nasal composition difficult to manage unless stabilized. It can also reduce the shelf life and availability of associated products.

Further, while PUFAs have been shown to have some antiviral activity against a limited number of viruses, there is no evidence to suggest that PUFAs are effective against Coronaviruses or could otherwise have an appreciable effect on symptomatic upper respiratory tract infections.

Virustatic and Antibacterial Properties of Neem Oil

Neem oil is an oil obtained by the cold pressing of the *Azadirachta indica* seeds. It is well documented in the literature that neem oil has some limited antibacterial and antiviral activity. For example, neem oil has been shown to be an effective antibacterial against *Vibrio vulnificus, Escherichia coli, Staphylococcus epidermidis*, and *Pseudomonas aeruginosa*. With respect to its antiviral activities, neem oil has been shown to be effective against herpes simplex virus type-1 and against the envelope protein of the dengue virus.

However, neem oils have not been shown—and are not expected to—function as an antimicrobial barrier, particularly within the oral mucosa, on their own, and there is no indication that their combination with other antimicrobial compounds would increase their efficacy or allow for such application. Further, there is no indication that neem oils are effective against Coronaviruses on their own, and there is no indication that combination with other antimicrobial compounds would increase their efficacy or allow for such application.

Virustatic and Antibacterial Properties of *Hypericum* Oil

*Hypericum* oil is an extract of the common St. John's Wort (*Hypericum* spp.) and includes the compound hypericin, which can also be synthesized from the anthraquinone derivative emodin. As the main component of *Hypericum* perforatum, hypericin has traditionally been used throughout the history of folk medicine. Hypericin has also become the subject of intensive biochemical research and is proving to be a multifunctional agent in drug and medicinal applications. Recent studies report antidepressive, antineoplastic, antitumor, and some limited antiviral activities of hypericin. For example, hypericin from *Hypericum* perforatum has been shown to significantly reduce the mRNA expression and virus titer of bronchitis virus and hypericin derived from *Hypericum* perforatum was shown to have antiviral effects in patients with chronic hepatitis C infection. Extracts from *Hypericum japonicum* have been shown to inhibit Epstein-Barr virus and Kaposi's sarcoma associated herpesvirus.

However, like neem oil, extracts of *Hypericum* spp. have not been shown—and are not expected to—function as an antimicrobial barrier, particularly within the oral mucosa, on their own, and there is no indication that combination with other antimicrobial compounds such as neem oil would increase their efficacy or allow for such application.

Virustatic Properties of Carrageenans

Carrageenans are a family of linear sulfated polysaccharides which are a major component of cell walls of and extracted from red seaweed (of the Rhodophyceae class) and are used extensively in industries like the food, cosmetic, and pharmaceutical industries as an additive for gelling, thickening, and stabilizing compositions, as carrageenans are generally recognized as safe in accordance with U.S. Food and Drug Regulations, specifically 21 C.F.R. 182.7255. For example, carrageenans are used as an emulsifying and binding agent for products like ice cream, gels, toothpaste, and others. Carrageenans are high-molecular-weight polysaccharides comprising repeating galactose units and 3, 6 anhydrogalactose joined by glycosidic linkages. Carrageenans comprise between 30% and 75% of the algal dry weight of certain red seaweed species such as Chondrus, Gigartina, Hypnea, and Eucheuma. Carrageenans are classified based on structural characteristics including sulfation patterns (kappa, iota, and lambda varieties comprising one, two, and three sulfate groups, respectively).

It has been found that carrageenans form a mucoadhesive layer on the surface of the nasal mucosa and interact with numerous different virus particles. This is thought to form a shielding layer on the surfaces of the virus particles, preventing interaction between the mucosa and infection of the host cells. This provides an antiviral activity against a range of animal viruses and are even used to prevent sexually transmitted infections as a component of spermicides. In vitro and in vivo studies have shown that carrageenans are potent inhibitors of viruses such as papilloma virus, rhinovirus, influenza A, respiratory syncytial virus, and human enterovirus 71.

However, there is no indication that a combination of carrageenans with other antimicrobial compounds such as neem oil, PUFAs, or extracts of *Hypericum* spp. would increase their efficacy or allow for such application.

Virustatic and Antibacterial Properties of Chlorhexidine 1,6-bis(4'-chloro-phenylbiguanide) hexane is a divalent, cationic biguanide commonly known as chlorhexidine. Chlorhexidine (in the form of chlorhexidine gluconate, chlorhexidine digluconate, and chlorhexidine acetate) is a broad-spectrum disinfectant and antiseptic that is commonly used for skin disinfection, surgical instrument disinfection, wound cleaning, preventing dental plaque, and other uses. It is widely used, despite its side effects, in disinfectants, cosmetics, and pharmaceutical products due to its activity against both Gram-positive and Gram-negative bacteria, anaerobes, fungi, and some viruses.

Chlorhexidine is believed to operate by dissociating at physiologic pH and releasing a positively charged chlorhexidine cation, which binds to negatively charged bacterial cell walls and affects the osmotic equilibrium of the bacterium, leading to bacteriostatic effects or cell death. That is, the biguanide groups of the chlorhexidine molecules bind to anionic sites on the cell wall, with the formation of bridges between adjacent acidic phospholipid head groups (due to the relatively small size of chlorhexidine-six carbons long) displacing the divalent cations (i.e. $Mg^{2+}$ and $Ca^{2+}$) that ordinarily stabilize the cell membrane, causing the cell to leak potassium ions and protons. However, chlorhexidine is known to be less effective in the presence of organic material such as serum. Chlorhexidine is also known to be ineffective against non-enveloped viruses.

However, there is no indication that a combination of chlorhexidine with other antimicrobial compounds such as neem oil, PUFAs, extracts of *Hypericum* spp., or carrageenans would increase chlorhexidine's efficacy or allow for such application.

Overview of Antimicrobial Compositions

Viruses commonly transmit through respiratory droplets produced when an infected person coughs or sneezes. Those droplets can then be inhaled by non-infected people. One strategy for preventing or minimizing transmission from respiratory viruses is to provide a barrier at the point of entry (e.g., in the oral mucosa).

To be effective, a barrier film applied to the oral mucosa needs to be non-water soluble to prevent it from being immediately dispersed in the aqueous environment of the oral mucosa. Mouth sprays are often glycerol-based as glycerol possesses minor antimicrobial and antiviral properties and is widely used in FDA approved wound and burn treatments. The barrier should preferably be an effective shield against gram-positive and gram-negative bacteria, as well as enveloped and non-enveloped viruses.

Embodiments of the present disclosure include a therapeutically effective concentration of neem oil and extract from *Hypericum* spp. administered as a lotion, hydrogel, mouth spray, or nasal spray to create a synergistically beneficial antimicrobial barrier, particularly when applied to the oral mucosa.

Other embodiments of the present disclosure include a therapeutically effective concentration of PUFAs, neem oil, and extract from *Hypericum* spp. administered as a lotion, hydrogel, mouth spray, or nasal spray to create a synergistically beneficial antimicrobial barrier, particularly when applied to the oral mucosa. Yet other embodiments of the present disclosure include a therapeutically effective concentration of PUFAs administered as a lotion, hydrogel, mouth spray, or nasal spray to create a beneficial antimicrobial barrier, particularly when applied to the oral mucosa.

Other embodiments of the present disclosure include a therapeutically effective concentration of one or more of PUFAs, neem oil, and extract from *Hypericum* spp. in combination with one or more of carrageenans and chlorhexidine.

Other embodiments of the present disclosure include a therapeutically effective concentration of PUFAs and carrageenans administered as a lotion, hydrogel, mouth spray, or nasal spray to create a beneficial antimicrobial barrier, particularly when applied to the oral mucosa. Yet other embodiments of the present disclosure include a therapeutically effective concentration of PUFAs and one or more enzymes as will be described in greater detail herebelow, the composition administered as a lotion, hydrogel, mouth spray, or nasal spray to create a beneficial antimicrobial barrier, particularly when applied to the oral mucosa.

In some instances, the antimicrobial solutions of the present disclosure can reduce the titer of viral pathogens, and the synergistic benefit provided by the antimicrobial compositions can extend to enabling a barrier function to microbial pathogens that the compounds do not affect individually.

For example, while the components of the disclosed antimicrobial compositions may not individually provide a barrier function to Coronaviruses, the combination unexpectedly and beneficially does. In embodiments, while individual PUFAs, such as ALA, EPA, and DHA, may not individually provide a barrier function to Coronaviruses, the combination of PUFAs, preferably omega-3 fatty acids unexpectedly and beneficially does.

This is particularly unexpected as PUFAs, neem oil, *Hypericum* oil, and carrageenans are regarded by the FDA as food additives and are therefore not considered to possess pharmacological effects in their own right or to be toxic. Yet, their combination provides a transformative effect, enabling their application as a microbial barrier, particularly within the oral mucosa. Additionally, in some embodiments, the transformative effect of the disclosed combinations allows for symptomatic relief from upper respiratory tract infections, particularly upper respiratory tract infections caused by a virus. This can include, for example, a reduction in symptoms such as runny nose, sneezing, coughing, sore throat, and/or tiredness.

In some instances, the disclosed synergistic combination of neem oil, *Hypericum* extract, PUFAs, carrageenans, and/or chlorhexidine according to the various embodiments reduces inflammation during infection. This can beneficially allow for reduced swelling within the airways to facilitate less labored breathing and/or reduce a feeling of congestion.

In embodiments, the antimicrobial composition is configured to produce and maintain free fatty acids relative to fatty acids. It has been found that providing a composition in which fatty acids (such as those from PUFAs and/or the naturally occurring fatty acids in *Hypericum* extract) oxidize to free fatty acids, the antiviral effects of the composition are improved. This is thought to occur as the free fatty acids, which are much smaller than the fatty acids, are able to fit between the spike proteins on the surface of viruses and to interact with the viral membrane, disrupting or dissolving the membrane in the process and inactivating the virus. Fatty acids, being much larger, are impeded by the spike proteins and cannot provide this virustatic/virucidal property.

Figure 5:
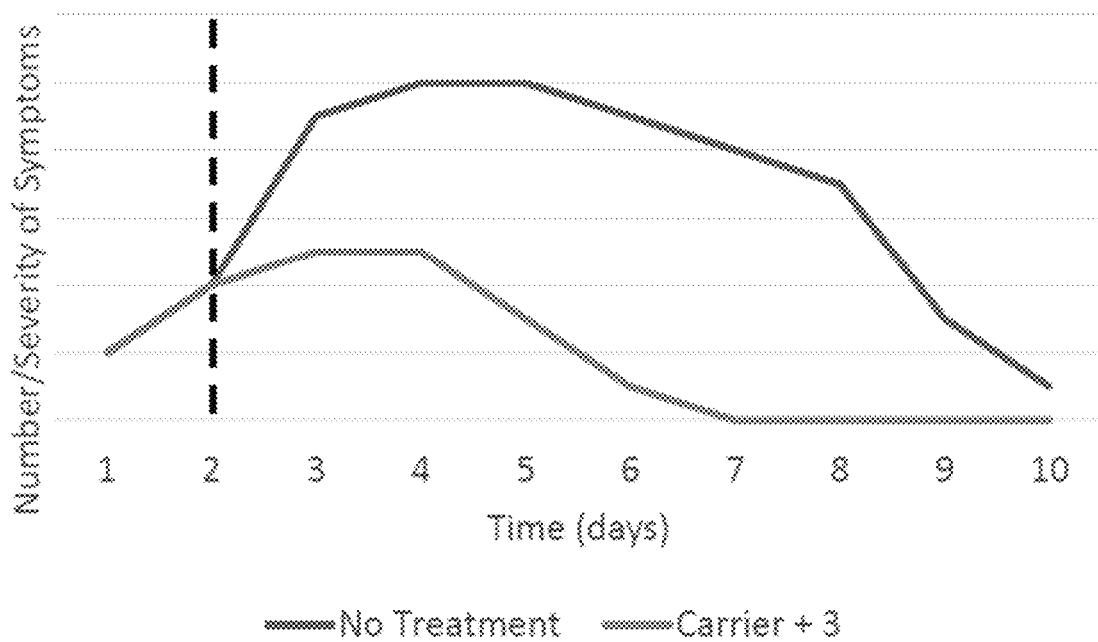
Figure 6:
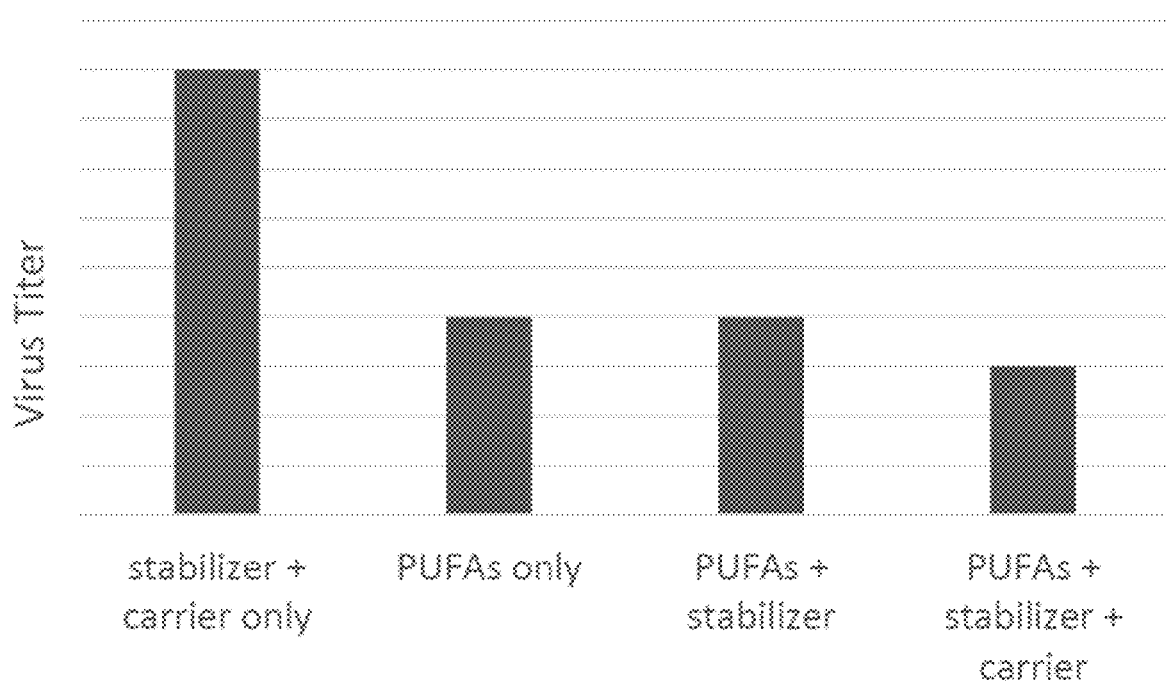

In addition to symptom alleviation during the course of the infection/disease, embodiments of the present disclosure can reduce the total number of days an individual presents with a symptomatic infection (e.g., as shown in FIG. 5).

As described in greater detail within the Examples provided herein, embodiments of the present disclosure can additionally, or alternatively, reduce viral load or the detection of virions within an infected individual.

When provided in a spray form, the disclosed antimicrobial (preferably antiviral) compositions, or at least the active components thereof, can be administered using an inert propellant as known in the art. This can beneficially allow for the oral application of the disclosed compositions by way of a non-toxic propellant that can be safely inhaled by the user and/or surrounding individuals.

Alternatively, the disclosed antimicrobial (preferably antiviral) compositions can be delivered as an atomized spray without the use of propellants. In such an embodiment, the viscosity of the composition may need to be adjusted with the addition of glycerol and/or water to obtain the desired viscosity capable of delivering the clinically effective amount of active components within the modified composition to have the disclosed benefits and salubrious effects.

Methods of treating or preventing infection of the upper respiratory tract of humans can include administering the antimicrobial compounds disclosed herein to the oral mucosa. This can be done, for example, through the use of a throat or nasal spray. Spray devices known and used in the art can be co-opted for such use. Such devices typically release 30-200 µL per actuation, and the antimicrobial compositions can be formulated for efficacy and palatability.

As a non-limiting example, the disclosed spray formulations can be administered to one of, or preferably both of, the naso- and oropharyngeal mucosa by spraying into the nose and mouth of affected individuals. In embodiments, the antimicrobial solution is delivered in 50 µL-200 µL doses per actuation of the mouth spray and/or nasal spray. While 50 µL-200 µL doses per actuation has been described, it will be appreciated that any suitable volume per actuation may be delivered as suitable based on the particular composition, components thereof, and needs of a user. The antimicrobial solution may be provided in a suitable container/dispenser, such as a spray bottle, configured for delivering a predetermined quantity, such as 50 µL-200 µL, per actuation, and in embodiments the container/dispenser may be configured independently for application to the nasal cavity and the oral cavity.

In some embodiments, antioxidants can be added to the antimicrobial compositions to prevent the oxidation of one or more components, such as the neem oil or *Hypericum* extracts, and thereby increase the shelf life and performance of the compositions over time.

In one embodiment, the disclosed antimicrobial compositions can be used to prevent and/or treat infections caused by Coronaviruses, such as SARS-CoV-1 and SARS-CoV-2 (or variants thereof). Administration of the disclosed antimicrobial compositions (e.g., via administration to the naso- and oropharyngeal mucosa by spraying into the nose and mouth of affected individuals) are associated with a shortened duration that an individual experiences infection with the causative Coronavirus. In some instances, such administration is also associated with a reduced severity of the disease, which can beneficially reduce the viral load in the airway and decrease the risk or likelihood of transmission to others.

As such, embodiments of the present disclosure can reduce the spread and contagiousness of the causative agent of disease. Additionally, if the administration slows or reduces symptomatic infection, there is likely to be a lower burden on the healthcare system, including use of emergency medical services and/or medical equipment (e.g., ventilators). This can beneficially decrease the morbidity and mortality rate of the community at large by not overburdening the healthcare system or causing a decrease in resource availability.

Various omega-3 fatty acids can be included within the disclosed compositions. In some embodiments, the omega-3 fatty acids include a combination of omega-3 fatty acids such as a combination of ALA, EPA, and DHA. These can be included within the cocktail of omega-3 fatty acids at the average concentration found in cold water fish skin, preferably within the skin of an Atlantic cod.

In some embodiments, the relative concentration of PUFAs is adjusted until the desired benefit is achieved.

Additional Embodiments

Proteolytic enzymes applied to the oral cavity can reduce the severity and duration of the common cold. An oral spray including proteolytic enzymes was found efficacious in reducing the severity and duration of the common cold in a randomized study. This trial involved 267 participants with a naturally occurring common cold who were randomly assigned to use the spray six times daily or receive no treatment. The spray is marketed under several brand names, including PreCold®, ColdZyme®, and CortaGrip and contains cod derived trypsin from the Icelandic company Zymetech.

The researchers found that overall symptom scores on the Jackson cold scale within the first seven days were lower in the treated group (area under the curve: 39.6 vs. 46.2). There were significant effects on the individual symptoms of sore throat, nose congestion, and headache. Quality-of-life scores for all domains were improved and disease duration was shorter in the treated group.

The spray is a barrier solution containing glycerol and the enzyme trypsin, obtained from Atlantic cod. Previous in vitro research showed that it can inactivate 99% of viruses that cause the common cold, including influenza and rhinovirus. Problematically, however, the cost and palatability of such compounds is a known issue for these products.

In some embodiments, the antimicrobial compositions disclosed herein can additionally include one or more enzymes, such as a proteolytic enzyme, preferably a marine derived protease or collagenase, to maintain or increase its effectiveness as an antimicrobial barrier. Because the antimicrobial compositions already function as an antimicrobial barrier (e.g., in the oral mucosa), such additional proteases can be added at lower concentrations than previously used, potentially at a concentration where the protease would not be effective as an antimicrobial on its own. This can beneficially reduce the cost burden of using such compounds in a commercial product and can also increase the palatability. The optional addition of taste-enhancing additives, such as menthol, may also increase the palatability of the composition.

In embodiments, the one or more enzymes, such as protease and/or collagenase, extend the effectiveness of antimicrobial compositions to non-enveloped viruses as well as enveloped viruses. While protease or collagenase have been described, it will be appreciated that any suitable enzyme or combination of enzymes may be added in any suitable quantity. In embodiments, the enzyme or combination of enzymes includes one or more of papain, ficain, bromelain, pepsin, rennin, cathepsin, trypsin, or any other suitable enzyme. The addition of the one or more enzymes advantageously provides an animal-based component for broad-spectrum efficacy.

In embodiments, an antimicrobial composition according to embodiments may comprise ascorbic acid (a.k.a. Vitamin C), the ascorbic acid advantageously lowering the pH of the antimicrobial composition. It has been found that the stabilizer included in embodiments operates better at low pH. In embodiments, the pH of the composition is maintained at approximately 6 to be consistent with the pH of the nose. To maintain free fatty acids at certain pH levels (as described above), embodiments may include trisodium citrate and/or citric acid.

While application of the antimicrobial compositions against and to prevent coronaviruses has been described, it will be appreciated that the compositions may be used for any suitable microbial ailment, and are by no means limited to sprays for the nose and mouth. The antimicrobial compositions of the present disclosure advantageously are configured so as to be effective for and used against enveloped viruses such as RSV, eye infections, oral infections including cold sores, and non-enveloped viruses generally.

CONCLUSION

Unless defined otherwise, all technical and scientific terms used herein have the same meaning as commonly understood by one of ordinary skill in the art to which the present disclosure pertains.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatuses disclosed herein may be made without departing from the scope of the disclosure or of the invention. Thus, while various aspects and embodiments have been disclosed herein, other aspects and embodiments are contemplated. All changes that come within the meaning and range of equivalency of the claims are to be embraced within their scope.

EXAMPLES

The following examples as set forth herein are intended for illustrative purposes only and are not intended to limit the scope of the disclosure in any way.

Examples 1-5

As shown in the graph of FIG. 2, antimicrobial solutions of the present disclosure can have a synergistic effect when including each of neem oil and extract from *Hypericum* spp., preferably hypericin. The synergistic effect can, in some instances, provide increased antimicrobial activity, preferably increased viricidal activity, but it can additionally, or alternatively, include an expansion of antimicrobial activity to one or more microbes not substantially affected by the individual components of the antimicrobial solution.

For example, Coronaviruses, or the diseases caused thereby, may not be substantially affected (e.g., neutralized, otherwise rendered non-infective, or reduced time or morbidity of symptomatic infection) when treated with neem oil or extract from *Hypericum* spp. individually. However, when treated with an antimicrobial solution of the present disclosure that includes a combination of neem oil and extract from *Hypericum* spp., preferably hypericin, Coronaviruses, or the diseases caused thereby, can be affected.

These data evidence an unexpected synergistic effect by the antimicrobial solutions of the present disclosure. The synergistic effect is observed by reducing a number or concentration of viral titer and/or by the expansion of efficaciousness to Coronaviruses, as exemplified in the graph of FIG. 2 (e.g., "neem+*Hypericum*" and "neem+*Hypericum*+carrier" results).

Antimicrobial solutions associated with results illustrated in FIG. 2 are made and can include one or more of the solutions provided in Table 1 below (each antimicrobial solution corresponding to Examples 1-5, respectively). All percentages disclosed in Table 1 are proportional volumes with respect to the final volume of the antimicrobial solution.

TABLE 1

| | Example 1 | Example 2 | Example 3 | Example 4 | Example 5 |
|---|---|---|---|---|---|
| Carrier | 50% | 75% | 80% | 90% | 95% |
| Neem oil and *Hypericum* spp. oil | 50% | 25% | 20% | 10% | 5% |

Antimicrobial compositions of Examples 1-5 can be commensurate in scope with the data illustrated in FIG. 2 (e.g., "neem+*Hypericum*" results).

As provided in Table 1, and other Tables below, the term "carrier" is intended to include one or more pharmaceutically acceptable carriers, additives, and/or diluents, preferably at least glycerol and in some embodiments a flavor-enhancing additive such as menthol. The term "stabilizer" is intended to include an antioxidant, preferably an oil-based antioxidant suitable for preventing the oxidation of PUFAs within a solution.

Examples 6-10

Table 2 below includes antimicrobial compositions having various concentrations of the carrier and a mixture of the neem oil and extract from *Hypericum* spp. In each of Examples 6-10, the relative concentrations of neem oil and extract from *Hypericum* spp. remain proportional with one another. Each formulation is illustrated as Examples 6-10, respectively, and can be commensurate in scope with the results illustrated in FIG. 2 (e.g., "neem+*Hypericum*+carrier" results).

TABLE 2

|  | Example 6 | Example 7 | Example 8 | Example 9 | Example 10 |
|---|---|---|---|---|---|
| Carrier | 10% | 20% | 33% | 50% | 80% |
| Neem oil | 45% | 40% | 33% | 25% | 10% |
| *Hypericum* spp. oil | 45% | 40% | 33% | 25% | 10% |

Examples 11-20

Table 3 below includes antimicrobial compositions having various concentrations of each of the carrier, neem oil, and extract from *Hypericum* spp. with the neem oil and *Hypericum* spp extract being provided in different relative concentrations. Each formulation is illustrated as Examples 11-20, respectively. Examples 11-20 can be commensurate in scope with the data illustrated in FIG. 2 (e.g., "neem+*Hypericum*+carrier" results).

TABLE 3

|  | Example 11 | Example 12 | Example 13 | Example 14 | Example 15 |
|---|---|---|---|---|---|
| Carrier | 50% | 60% | 60% | 60% | 80% |
| Neem oil | 25% | 20% | 30% | 10% | 10% |
| *Hypericum* spp. oil | 25% | 20% | 10% | 30% | 10% |

|  | Example 16 | Example 17 | Example 18 | Example 19 | Example 20 |
|---|---|---|---|---|---|
| Carrier | 80% | 80% | 90% | 90% | 90% |
| Neem oil | 15% | 5% | 5% | 9% | 1% |
| *Hypericum* spp. oil | 5% | 15% | 5% | 1% | 9% |

Examples 21-25

As shown in the graph of FIG. 3, antimicrobial solutions of the present disclosure can have a synergistic effect when including each of PUFAs, preferably omega-3 fatty acids, neem oil, and extract from *Hypericum* spp., preferably hypericin. The synergistic effect can, in some instances, provide increased antimicrobial activity, preferably increased viricidal activity, but it can additionally, or alternatively, include an expansion of antimicrobial activity to one or more microbes not substantially affected by the individual components of the antimicrobial solution.

For example, Coronaviruses, or the diseases caused thereby, may not be substantially affected (e.g., neutralized, otherwise rendered non-infective, or reduced time or morbidity of symptomatic infection) when treated with PUFAs, neem oil, or extract from *Hypericum* spp. individually. However, when treated with an antimicrobial solution of the present disclosure that includes a combination of PUFAs, preferably omega-3 fatty acids, neem oil, and extract from *Hypericum* spp., preferably hypericin, Coronaviruses, or the diseases caused thereby, can be affected.

These data evidence an unexpected synergistic effect by the antimicrobial solutions of the present disclosure. The synergistic effect is observed by reducing a number or concentration of viral titer and/or by the expansion of efficaciousness to Coronaviruses, as exemplified in the graph of FIGS. 4 and 5 (e.g., "Carrier+3" results).

Antimicrobial solutions associated with results illustrated in FIGS. 3 and 4 are made and can include one or more of the solutions provided in Table 4 below (each antimicrobial solution corresponding to Examples 21-25, respectively). All percentages disclosed in Table 4 are proportional volumes with respect to the final volume of the antimicrobial solution.

TABLE 4

|  | Example 21 | Example 22 | Example 23 | Example 24 | Example 25 |
|---|---|---|---|---|---|
| Carrier | 50% | 75% | 80% | 90% | 95% |
| PUFAs, neem oil, and *Hypericum* spp. oil | 50% | 25% | 20% | 10% | 5% |

Figure 2:
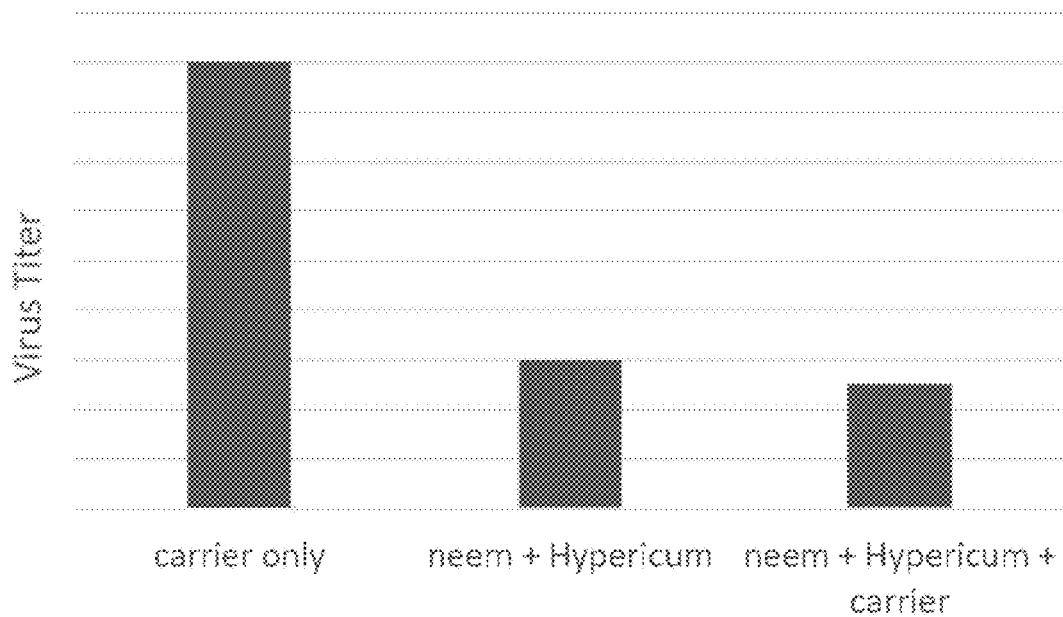
FIG. 2 is a bar graph illustrating the concentration of Coronavirus virions when treating with (i) carrier alone; (ii) neem oil and extract of the plant *Hypericum* spp.; and (iii) neem oil and extract of the plant *Hypericum* spp., optionally plus carrier, in accordance with one or more embodiments of the present disclosure.

Antimicrobial compositions of Examples 21-25 can be commensurate in scope with the data illustrated in FIGS. 2 and 3 (e.g., "Carrier+3" results).

Examples 26-30

Table 5 below includes antimicrobial compositions having various concentrations of the carrier and a mixture of the PUFAs, neem oil, and extract from *Hypericum* spp. In each of Examples 26-30, the relative concentrations of the PUFAs, neem oil, and extract from *Hypericum* spp. remain proportional with one another. Each formulation is illustrated as Examples 26-30, respectively, and can be commensurate in scope with the results illustrated in FIGS. 2 and 3 (e.g., "Carrier+3" results).

TABLE 5

|  | Example 26 | Example 27 | Example 28 | Example 29 | Example 30 |
|---|---|---|---|---|---|
| Carrier | 0% | 25% | 40% | 70% | 85% |
| PUFAs | 33% | 25% | 20% | 10% | 5% |
| Neem oil | 33% | 25% | 20% | 10% | 5% |
| *Hypericum* spp. oil | 33% | 25% | 20% | 10% | 5% |

Examples 31-35

Table 6 below includes antimicrobial compositions having various concentrations of each of the carrier, neem oil, and extract from *Hypericum* spp. with a conspicuous absence of PUFAs from the compositions. Each formulation is illustrated as Examples 31-35, respectively.

TABLE 6

|  | Example 31 | Example 32 | Example 33 | Example 34 | Example 35 |
| --- | --- | --- | --- | --- | --- |
| Carrier | 33% | 50% | 60% | 80% | 90% |
| PUFAs | 0% | 0% | 0% | 0% | 0% |
| Neem oil | 33% | 25% | 20% | 10% | 5% |
| *Hypericum* spp. oil | 33% | 25% | 20% | 10% | 5% |

Examples 36-40

Table 7 below includes antimicrobial compositions having various concentrations of each of the carrier, PUFAs, and extract from *Hypericum* spp. with a conspicuous absence of neem oil from the compositions. Each formulation is illustrated as Examples 36-40, respectively.

TABLE 7

|  | Example 36 | Example 37 | Example 38 | Example 39 | Example 40 |
| --- | --- | --- | --- | --- | --- |
| Carrier | 33% | 50% | 60% | 80% | 90% |
| PUFAs | 33% | 25% | 20% | 10% | 5% |
| Neem oil | 0% | 0% | 0% | 0% | 0% |
| *Hypericum* spp. oil | 33% | 25% | 20% | 10% | 5% |

Examples 41-45

Table 8 below includes antimicrobial compositions having various concentrations of each of the carrier, PUFAs, and neem oil with a conspicuous absence of extract from *Hypericum* spp. from the compositions. Each formulation is illustrated as Examples 21-25, respectively.

TABLE 8

|  | Example 41 | Example 42 | Example 43 | Example 44 | Example 45 |
| --- | --- | --- | --- | --- | --- |
| Carrier | 33% | 50% | 60% | 80% | 90% |
| PUFAs | 33% | 25% | 20% | 10% | 5% |
| Neem oil | 33% | 25% | 20% | 10% | 5% |
| *Hypericum* spp. oil | 0% | 0% | 0% | 0% | 0% |

While in some instances the compositions associated with Examples 31-45 may affect the pathogenicity of microbes, it is not expected that these compositions affect Coronaviruses or other upper respiratory tract pathogens to the same degree as the compositions associated with Examples 21-30. Instead, the compositions associated with Examples 31-45 are expected to have a combinatorial affect, if any, on Coronavirus (or other upper respiratory tract pathogens) titers and/or pathogenicity—not a synergistic effect as seen with the compositions disclosed in Examples 21-30.

Examples 31-45, corresponding to Tables 6-8, can be commensurate in scope with the data illustrated in FIG. 3 (e.g., "Carrier+2" results).

Example 26

Antimicrobial compositions of the present disclosure were tested for smell and palatability. Ten samples were prepared according to the following formulation:

14 mL glycerol 1.5 mL neem oil+*Hypericum* extract formulation 1.5 mL omega-3 PUFA stock formulation 3 mL $H_2O$ <1 mL of concentrated flavoring (no flavoring added to control)

Each formulation was labeled according to the flavor added. Five volunteers tasted and smelled the mixtures and rated each mixture on a scale from 0-10 (0 being the worst taste/smell and 10 being the best taste/smell). Between each taste and smell test, participants smelled coffee and tasted oranges between samples to neutralize any previously pleasant/unpleasant taste and/or smell so as to not prejudice the following taste and smell test.

Table 9 below illustrates the results with numbers from left to right in each column indicating first the smell score and second the taste score.

TABLE 9

| Participant | Control | | Ginger | | Coffee | | Apricot | | Cardamom | |
|---|---|---|---|---|---|---|---|---|---|---|
| 1 | 2 | 0 | 2 | 0 | 2 | 0 | 2 | 0 | 2 | 0 |
| 2 | 5 | 3 | 5 | 3 | 5 | 3 | 5 | 3 | 5 | 0 |
| 3 | 2 | 1 | 2 | 1 | 7 | 5 | 5 | 4 | 6 | 5 |
| 4 | 2 | 1 | 2 | 1 | 5 | 4 | 5 | 3 | 5 | 5 |
| 5 | 2 | 1 | 2 | 1 | 5 | 1 | 2 | 1 | 4 | 3 |
| Participant | Lemon | | Caramel | | Almond | | Vanilla | | Cloves | |
| 1 | 7 | 3 | 8 | 7 | 6 | 3 | 5 | 3 | 3 | 3 |
| 2 | 9 | 6 | 9 | 8 | 9 | 7 | 7 | 6 | 6 | 4 |
| 3 | 7 | 6 | 8 | 6 | 7 | 6 | 5 | 6 | 6 | 5 |
| 4 | 6 | 6 | 7 | 7 | 7 | 5 | 7 | 7 | 7 | 4 |
| 5 | 7 | 5 | 8 | 8 | 8 | 6 | 8 | 5 | 6 | 4 |

As shown in Table 9 above, the top preferred flavourings include caramel with an average score of 7.2, lemon with an average score of 5.8, and almond or vanilla, each having an average score of 5.4.

Example 27

A composition capable of atomization was made using the following formula, which was found to be stable and did not separate for at least 30 minutes after mixing:

16 mL glycerol (85% v/v)

1.5-2 mL neem oil+*Hypericum* extract formulation (5%-10% v/v)

0.5-1 mL omega-3 PUFA stock (5% v/v)

3.0-3.5 mL water for correct viscosity

<1 mL flavouring (e.g., those listed in Example 26, *Eucalyptus*, or menthol).

The neem oil+*Hypericum* extract provided in the example formulation above can include a high content of saturated and polyunsaturated fatty acids in its own right. For example, a stock formulation of neem oil+*Hypericum* extract can include concentrations of the fatty acids listed in Table 10 below.

TABLE 10

| Fatty acid | Description | Content (%) |
|---|---|---|
| Palmitic acid | saturated | 13.5-14.1 |
| Stearic acid | saturated | 8.3-11.4 |
| Oleic acid | Ω-9 polyunsaturated | 57.8-61.4 |
| Linoleic acid | Ω-6 polyunsaturated | 10.3-12.6 |
| Linolenic acid | Ω-3 polyunsaturated | 0.7-1.0 |

Example 28

In one clinical study, over 70 patients presenting with early symptoms of upper respiratory tract infections (e.g., runny nose and throat ache) were treated with a spray composition disclosed herein that included omega-3 PUFAs, neem oil, and *Hypericum* extract. Attending physicians administered the spray into the naso- and oropharyngeal cavity of each patient to combat the effects of COVID-19 (or other causative virus) on the mucosa. Following administration, 70 patients showed a reduction or complete resolution of symptoms.

An example of the symptomatic relief experienced by patients in this study is shown in FIG. 5 where after symptom presentation (illustrated by the dashed vertical line at 2 days post infection), the patient was given a repeated dose of the spray composition disclosed herein including omega-3 PUFAs, neem oil, and *Hypericum* extract. As shown, the number and/or severity of symptoms was significantly reduced in degree and time compared to untreated individuals.

Examples 29-33

As shown in the graph of FIG. 6, antimicrobial solutions of the present disclosure can have a microbial barrier effect when including PUFAs, preferably omega-3 fatty acids in a spray composition. This effect can, in some instances, provide increased antimicrobial activity, preferably increased viricidal activity, but it can additionally, or alternatively, include an expansion of antimicrobial activity to one or more microbes not substantially affected by the individual components of the antimicrobial solution.

For example, Coronaviruses, or the diseases caused thereby, may not be substantially affected (e.g., neutralized, otherwise rendered non-infective, or reduced time or morbidity of symptomatic infection) when treated with individual PUFAs. However, when treated with an antimicrobial solution of the present disclosure that includes a combination of PUFAs, preferably a combination of omega-3 fatty acids, Coronaviruses, or the diseases caused thereby, can be affected.

These data evidence an unexpected effect by the antimicrobial solutions of the present disclosure. The effect is observed by reducing a number or concentration of viral titer and/or by the expansion of efficaciousness to Coronaviruses, as exemplified in the graph of FIG. 6.

The control solutions associated with results illustrated in FIG. 6 are made and can include one or more of the solutions provided in Table 11 below (each antimicrobial solution corresponding to Examples 29-33, respectively). All percentages disclosed in Table 11 are proportional volumes with respect to the final volume of the antimicrobial solution.

TABLE 21

| | Example 29 | Example 30 | Example 31 | Example 32 | Example 33 |
|---|---|---|---|---|---|
| Carrier | 0% | 100% | 50% | 25% | 75% |
| Stabilizer | 100% | 0% | 50% | 75% | 25% |
| PUFAs | 0% | 0% | 0% | 0% | 0% |

The control solutions of Examples 29-33 can be commensurate in scope with the data illustrated in FIG. 6 (e.g., "stabilizers+carrier only" results).

Examples 34-38

Table 12 below includes antimicrobial compositions having various concentrations of various PUFAs. In Example 34, the relative concentrations of PUFAs remain proportional with one another. The relative proportionality can be an equivalent proportionality (e.g., each stock having 100 μg/mL of the noted PUFA) or can be a relative proportionality as observed in an environmental setting (e.g., the relative abundance of each in the Atlantic cod fish skin). In Examples 35-39, the relative concentrations of PUFAs are different. Each formulation is illustrated as Examples 34-38, respectively, and can be commensurate in scope with the results illustrated in FIG. 6 (e.g., "PUFAs only" results).

TABLE 12

| | Example 34 | Example 35 | Example 36 | Example 37 | Example 38 |
|---|---|---|---|---|---|
| ALA | 33% | 25% | 25% | 50% | 15% |
| EPA | 33% | 25% | 50% | 25% | 15% |
| DHA | 33% | 50% | 25% | 25% | 70% |

Examples 39-43

Table 13 below includes antimicrobial compositions having various concentrations of each of the PUF As of Examples 6-10 in addition to an oxidative stabilizer. Each formulation is illustrated as Examples 11-15, respectively. Examples 11-15, corresponding to Table 3, can be commensurate in scope with the data illustrated in FIG. 2 (e.g., "PUFAs+stabilizer" results).

TABLE 13

| | Example 39 | Example 40 | Example 41 | Example 42 | Example 43 |
|---|---|---|---|---|---|
| PUFAs | 50% | 75% | 80% | 90% | 95% |
| Stabilizer | 50% | 25% | 20% | 10% | 5% |

Examples 44-53

Table 14 below includes antimicrobial compositions having various concentrations of each of the PUFAs of Examples 34-38 in addition to an oxidative stabilizer and a carrier. Each formulation is illustrated as Examples 44-53, respectively, and can be commensurate in scope with the data illustrated in FIG. 6 (e.g., "PUFAs+stabilizer+carrier" results).

TABLE 14

|  | Example 44 | Example 45 | Example 46 | Example 47 | Example 48 |
|---|---|---|---|---|---|
| PUFAs | 50% | 60% | 60% | 60% | 80% |
| Stabilizer | 25% | 20% | 30% | 10% | 10% |
| Carrier | 25% | 20% | 10% | 30% | 10% |

|  | Example 49 | Example 50 | Example 51 | Example 52 | Example 53 |
|---|---|---|---|---|---|
| PUFAs | 80% | 80% | 90% | 90% | 90% |
| Stabilizer | 15% | 5% | 5% | 9% | 1% |
| Carrier | 5% | 15% | 5% | 1% | 9% |

The retention of an antimicrobial spray according to an embodiment of the present disclosure in the oral and nasal cavity was investigated. UV light was used to confirm that the antimicrobial solution embodiment is visible on the oropharyngeal mucosa and nasal cavity for at least two hours during fasting. This finding was determined by self-administering the antimicrobial solution to the nose and throat using two different applicator bottles. Two sprays were applied to the back of the throat and one per each nostril for a total of four sprays.

The presence of the antimicrobial solution was observed in a first test by visualizing the spray under UV light in a dark room on a single human test subject a total of four times over a two-hour period during which eating, drinking exercising, showering, toothbrushing, and other activities that might disrupt the barrier function of the antimicrobial solution were avoided. The visualizations detected the fluorescence of the spray in the nose and throat. The UV light source used for these visualizations was a 9 LED EFL41UV Flashlight with a UV wavelength of 395-400 nm, available from Velleman nv of Gavere, Belgium.

A visible spray pattern and droplets were detected in both the throat and nostrils. Brightness was checked every 15-30 minutes, and decreased with time but remained visible more than one hour after application of the antimicrobial solution. Approximately 90-120 minutes after application, droplets had dimmed and lines of spray became visible running down from the nasal cavity. The droplets and lines remained visible up to 140 minutes after application. Results are shown in Table 15 below.

TABLE 15

| Date | Mouth Pumps | Nostril Pumps (each) | Duration of experiment (minutes) |
|---|---|---|---|
| Oct. 10, 2020 | 1 | 1 | 90 |
| Oct. 11, 2020 | 1 | 1 | 105 |
| Oct. 12, 2020 | 1 | 1 | 140 |
| Oct. 15, 2020 | 1 | 1 | 135 |

The results of the four tests of Table 15 indicate the ability of antimicrobial solution embodiments according to the present disclosure to coat and remain on the oropharyngeal mucosa and the nasal cavity to a visibly detectable degree for a sustained period of time after application.

A second test was performed on seven human test subjects by administering a baseline antimicrobial spray and then visualizing the presence of the antimicrobial solution under UV light. The intensity of the emitted light is directly proportional to the amount of the antimicrobial solution present in the oropharyngeal mucosa. The human test subjects were instructed to avoid any food or drink for two hours and to check the intensity of the antimicrobial spray every 30 minutes. The amount of the antimicrobial spray visible was graded by each of the human test subjects on a scale of 0=not visible, 0.5=very faint, low coverage, 1=faint, but visible, low coverage, 1.5=bright, visible, limited coverage, 2=visible with some coverage, 2.5=bright and very visible spray droplets, reduced coverage, 3=bright and very visible spray pattern with good coverage. The results from the second test are shown below in Table 16.

TABLE 16

| Subject | Mouth Pumps | Nostril Pumps (each) | 0 min | 30 min | 60 min | 90 min | 120 min |
|---|---|---|---|---|---|---|---|
| A | 2 | 1 | 3 | NA | 2 | 2 | 1 |
| B | 2 | 1 | 3 | 2 | 1.5 | 1.5 | 0 |
| C | 2 | 1 | 3 | 3 | 2.5 | 3 | 2 |
| D | 2 | 1 | 3 | 3 | 2 | 2 | 2 |
| E | 2 | 1 | 2 | 2 | 2 | 1.5 | 1 |
| F | 2 | 1 | 3 | 1 | 0 | 0 | 0 |
| G | 2 | 1 | 3 | 2 | 2 | 1 | 1 |

In the above test, subject A missed the 30-minute appointment time, subject C reported an increase from 2.5 at 60 minutes to 3 at 90 minutes (likely due to a release from the nasal reservoir of spray), and subject E drank a small quantity of beverage at 120 minutes but as the visible effect was negligible the data point was not excluded. Subject B gave a "0" grade at 120 minutes but could still detect the flavor of the antimicrobial solution in the oral and nasal cavity, which reappeared 15 minutes later as a stream of spray from the nose and the amount was graded as "1".

Figure 7:
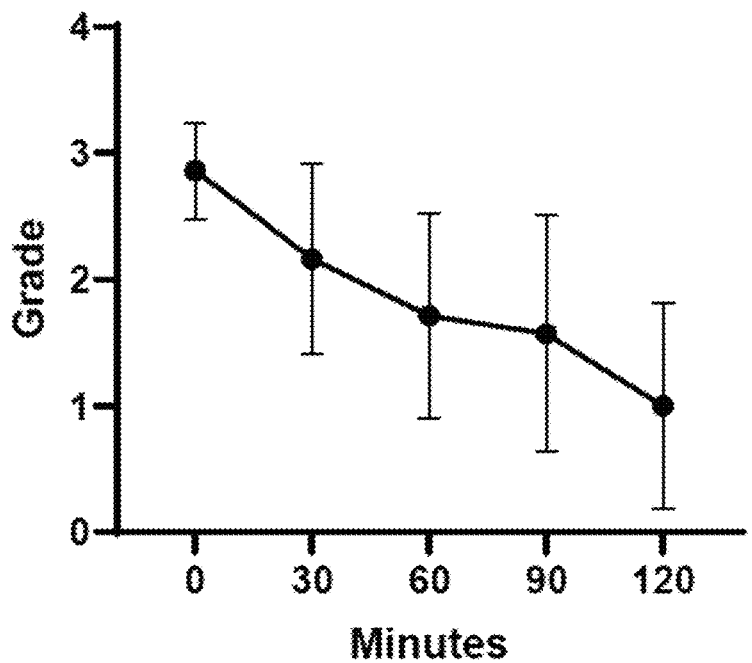

The data of Table 16 are visualized in FIG. 7, where the grade, i.e. the degree of retention, and visibility, i.e. the intensity of the emitted light from the oropharyngeal mucosa, for nearly all test subjects was high, with a median value of 3 ("Bright and very visible spray pattern with good coverage") immediately upon application and declined with time. For all subjects, the degree of retention and visibility declined steadily with time, and for most subjects (5 out of 7) remained detectable 120 minutes after application, with an overall median value at 120 minutes of 1 ("faint, but visible, low coverage"). Even many of the subjects who reported a grade of "0" for the throat mucosa still reported tasting the antimicrobial solution, suggesting the presence of at least a residual amount of spray in the nasal cavity.

The data of Table 16 and FIG. 7 indicate the ability of antimicrobial solutions according to embodiments to be retained in the oropharyngeal mucosa over a sustained period of time. Additionally, the data suggest the suitability of combinations of an oral spray and a nasal spray, such as distinct applications to the mouth and nose, with the oral spray giving immediate shield function in the back of the throat and the nasal spray providing longer-term protection due to droplets falling from the nasal cavity. In embodiments, a method of applying an antimicrobial solution according to the present disclosure includes applying the oral spray, such as at the beginning of the day or at the beginning of a shift, and then applying on one or more occasions the nasal spray throughout the day or shift.

These data provide strong evidence that the disclosed antimicrobial solutions can be beneficial in treating symptomatic upper respiratory tract infections by being retained on or in the oropharyngeal mucosa and providing synergistic antimicrobial and antiviral effects to any encountered virus particles or microbes. This advantageously prevents infection as the microbes and virus particles are prevented from infecting the host's tissue and are instead neutralized in the mucosa.

Observed benefits of the disclosed antimicrobial solutions include a reduction or alleviation of symptoms and are believed to have reduced inflammation within the upper respiratory tract. Additionally, these data point to a reduction in viral titers following administration of the disclosed antimicrobial spray.

Example 54

Table 17 below includes an antimicrobial composition having a specific concentration of *Hypericum* oil in combination with Neem oil, in addition to an oxidative stabilizer, a carrier, and other components.

TABLE 17

| Ingredient | % (v/v) |
|---|---|
| *Hypericum* oil | 60.0% |
| Neem oil | 0.05% |
| Water | 36.15% |
| Omega 3 | 0.07% |
| AMP 4455 | 2.0% |
| α-Tocopherol | 0.45% |
| Ascorbic Acid | 0.10% |
| Eucalyptus oil | 1.00% |
| *Stevia* | 0.08% |
| Potassium Sorbate | 0.10% |

In Example 54 above, the antimicrobial composition comprises a combination of an extract of the plant *Hypericum* spp., in Example 54 a *Hypericum* oil such as *Hypericum* perforatum oil, Neem oil, Omega 3 PUFAs, and components for facilitating the use of the combination of *Hypericum* oil, Neem oil, and PUFAs as a nasal and/or oral spray among other uses. For example, the antimicrobial composition comprises ascorbic acid (a.k.a. Vitamin C) to adjust the antimicrobial composition pH to a suitable level. The ascorbic acid may be provided in a range from, in a non-limiting example, 0.05-0.20% w/v. The antimicrobial composition may further comprise carrageenans (for example from 5-20% w/v) and/or chlorhexidine (for example from 0.05%-0.2% w/v, i.e. 0.05 mg/L-0.2 mg/L). In embodiments comprising carrageenans and/or chlorhexidine, the entire As described in U.S. Pat. No. 10,293,011, granted May 21, 2019, and incorporated herein in its entirety by reference, Neem oil has healing, repellent, antiseptic, and anti-inflammatory properties, and the oil extract of *Hypericum* has healing, lenitive, and antiseptic or antibiotic properties. Neem oil can be considered as one of the best healing and disinfectant agents for skin diseases. Neem oil can be also used as an anti-inflammatory for joint and muscle pain while *Hypericum* treats many ailments, including cuts, grazes, bruises, minor burns, sciatica, injured nerves, inflammations, ulcers, poisonous reptile bites, kidney and lung ailments, allergic reactions, anxiety and depression.

The Neem oil may be obtained either through cold/heat assisted pressing or through solvent extraction from the mature seeds from the neem tree (*Azadirachta indica* (A. Juss)). The oil obtained may be monitored for the absence of mycotoxins (aflatoxins).

The oil extract of St. John's wort (*Hypericum perforatum*) may be obtained through a maceration process of at least three to six weeks under the sun of the flowered crowns of St. John's wort in plant derived oil contained in clear glass recipients. The flowered crowns may be collected at the moment of maximum maturation. After the maceration process is complete the oil extract takes on the typical ruby red coloration. Subsequently the oil extract is filtered and stocked in dark glass recipients in order to avoid oxidative degradation processes due to exposition to natural light or ultraviolet rays. This particular procedure of preparation of the *Hypericum* oil extract guarantees its efficacy.

As demonstrated in the following experimental results the antimicrobial composition shows in combination a plurality of beneficial properties, including, in embodiments, healing effect, repellent effect, anti-inflammatory effect, lenitive effect, and antiseptic effect. The properties of each component are enhanced in comparison to the single plant components, thanks to the synergic effect. That is, the antimicrobial compositions of embodiments may show disinfectant, anti-inflammatory, anti-microbial, lenitive, analgesic, and/or other properties, and may provide broad spectrum protection, including against bacteria, without the use of a local antibiotic.

In embodiments, the *Hypericum* oil comprises a naphthodianthrone—hypericin—and optionally a phloroglucinol—hyperforin. The hypericin, in particular, may provide antibacterial effects against various Gram-positive bacteria and virustatic or virucidal effects against viruses, particularly enveloped viruses, among other benefits as explained above. It is thought that hypericin advantageously inhibits the ability of viruses to fuse with cell membranes.

Carrageenans advantageously provide a plant-based component to prevent viral interaction with the mucosa and/or cells of a user, amplifying and synergistically increasing the anti-viral and anti-bacterial effects of the *Hypericum* and Neem oils and the omega 3 PUFAs. Chlorhexidine advantageously provides an anti-bacterial effect to the antimicrobial composition and synergistically broadens the antimicrobial effects of the composition. Moreover, the chlorhexidine advantageously extends protection against non-enveloped or non-encapsulated viruses. Advantageously, the carrageenans and chlorhexidine cooperate synergistically with the *Hypericum* and Neem oils and omega 3 PUFAs to provide broad spectrum protection while minimizing and mitigating irritation to the user.

The antimicrobial composition may comprise one or more diluents, such as water, sea water, plant-based oils, paraffins, combinations thereof, or otherwise.

It has been surprisingly found that the combination of ascorbic acid, an emulsifier such as Palsgaard® Ammonium Phosphatide (AMP) 4455 available from Palsgaard A/S of Juelsminde, Denmark, and the *Hypericum* and Neem oils and Omega 3 PUFAs of the antimicrobial composition advantageously maintain a pH that is both amenable to application in the nose and/or the mouth while also maintaining a proper emulsification of the oil- and water-based components, particularly given the delicate nature of the fatty acids and *Hypericum* and Neem oils. While AMP 4455 has been described, it will be appreciated that other emulsifiers may be used, such as polyoxyethylene (20) sorbitan monooleate (a.k.a. "Polysorbate 80") or other emulsifiers. In embodiments, the amount of, for example, ascorbic acid is adjusted when using Polysorbate 80 to maintain a desired pH of the antimicrobial composition. For instance, when Polysorbate 80 is provided as an emulsifier, the amount of ascorbic acid may be correspondingly reduced, relative to embodiments using AMP 4455, in view of the lower pH of Polysorbate 80.

The ascorbic acid content of the antimicrobial composition of Example 54 advantageously is provided such that the pH of the antimicrobial composition is maintained at a desired level. In embodiments, the pH of the composition is approximately 6, for example to reduce or mitigate irritation to the sensitive nasal cavity. In embodiments, the pH of the composition is approximately 5. It has been found that a pH of 5 advantageously balances the quantity of free fatty acids (derived in solution from the *Hypericum* oil and/or the omega 3 PUFAs) which provide antimicrobial effects while minimizing irritation to the user's nasal and/or oral cavities. In other embodiments, the pH of the composition is approximately 4.5.

While the above pH levels have been described, it will be appreciated that any suitable pH may be utilized and any pH-adjusting component may be included in a suitable amount. For example, trisodium citrate may be utilized to adjust the pH of the composition to a desired level. In embodiments, distinct nasal and oral sprays may be provided, with the nasal spray having a higher pH than the oral spray in view of the sensitivity of the nasal cavity relative to the oral cavity. For example, the oral spray may have a pH of approximately 4.5 (down to a low value of, for example, 4.0, and up to a high value of, for example, 6.0), and the nasal spray may have a pH of approximately 5 (down to a low value of, for example, 4.6, and up to a high value of, for example, 6.0). In other embodiments a same spray and composition are applied to both the nasal and oral cavities.

The antimicrobial composition of Example 54 advantageously comprises an antioxidant. The antioxidant of Example 54 is α-tocopherol (a.k.a. Vitamin E), but it will be appreciated that any suitable antioxidant may likewise be contemplated in other embodiments and examples. For instance, other Vitamin E tocoperols, such as β-tocopherol, T-tocopherol, 8-tocopherol, Vitamin E tocotrienols such as α-tocotrienol, β-tocotrienol, I-tocotrienol, and 8-tocotrienol, or other suitable antioxidants may be provided as suitable. The antioxidant advantageously stabilizes the *Hypericum* and Neem oils and the omega 3 PUFAs during storage, lengthening the shelf life of the antimicrobial composition.

One or more components may be added to mask the flavors of the *Hypericum* and Neem oils. In Example 54, *Eucalyptus* oil and a *Stevia rebaudiana* extract or component are provided. In embodiments, the *Stevia rebaudiana* extract is rebaudioside A (Reb-A). In other embodiments, the *Stevia rebaudiana* extract is stevioside. It has been surprisingly found that the flavor-related components advantageously render the antimicrobial composition palatable to a user, particularly for nasal and/or oral application, without compromising the antimicrobial properties of the active ingredients, i.e. the *Hypericum* and Neem oils and the omega 3 PUFAs, the odors of which are surprisingly difficult to mask. While *Eucalyptus* oil and a *Stevia rebaudiana* extract or component have been described, it will be appreciated that any suitable component may be used to enhance the flavor and/or smell of the antimicrobial composition. For example, other sweeteners may be used, such as erythritol, xylitol, artificial sweeteners, or any other suitable compound.

For example, one or more oils such as Agar oil, Ajwain oil, *Angelica* root oil, Anise oil, Asafoetida oil, Balsam of Peru oil, Arborvitae oil, Basil oil, Bergamot oil, Black Pepper oil, Black Spruce oil, Blue Tansy oil, Buchu oil, Birch oil, Camphor oil, *Cannabis* flower oil, Calamodin oil, Caraway seed oil, Cardamom oil, Carrot seed oil, *Cassia* oil, Cedarwood oil, Celery Seed oil, Cilantro oil, Cinnamon Bark oil, Cistus ladanifer oil, Citronella oil, Clary Sage oil, Coconut oil, Clove oil, Coffee oil, Copaiba oil, Coriander oil, Costmary oil, Costus oil, Cranberry seed oil, Cubeb oil, Cumin seed oil, Cypress oil, Cypriol oil, Curry leaf oil, Davana oil, Dill oil, Douglas Fir oil, Elecampane oil, Elemi oil, Frankincense oil, Jasmine oil, Lavender oil, *Magnolia* oil, Neroli oil, Oregano oil, Peppermint oil, Rose oil, Tea Tree oil, Fennel oil, Fenugreek oil, Fir oil, Galangal oil, *Galbanum* oil, Garlic oil, Geranium oil, Ginger oil, Goldenrod oil, Grapefruit oil, Green Mandarin oil, Helichrysum oil, Henna oil, Hickory nut oil, Horseradish oil, Hyssop oil, Juniper Berry oil, *Laurus nobilis* oil, Lavender oil, Lemon oil, Lemongrass oil, Lime oil, *Litsea cubeba* oil, Linalool oil, Marjoram oil, Melissa oil, *Mentha arvensis* oil, Moringa oil, Myrrh oil, Mountain Savory oil, Mugwort oil, Mustard oil, Myrtle oil, Neroli oil, Nutmeg oil, Orange oil, Orris oil, Palo Santo oil, Parsley oil, Patchouli oil, *Perilla* oil, Pennyroyal oil, Petitgrain oil, Pine oil, Pink Pepper oil, Ravensara oil, Red Cedar oil, Roman Chamomile oil, Rose hip oil, Rosemary oil, Rosewood oil, Sage oil, Sandalwood oil, *Sassafras* oil, Savory oil, Schisandra oil, Siberian Fir oil, Spearmint oil, Spikenard oil, Spruce oil, Star anise oil, Tangerine oil, Tarragon oil, Thyme oil, *Tsuga* oil, Turmeric oil, Valerian oil, Wariona oil, Vetiver oil, Western red cedar oil, Wild Orange oil, Wintergreen oil, Yarrow/Pom oil, Ylang Ylang oil, or others may be used as antioxidants, preservatives, and/or aromatics.

In embodiments in which a distinct antimicrobial composition in the form of a spray is provided for application to the nasal cavity and the oral cavity, respectively, the nasal spray may comprise *Eucalyptus* oil as a flavor enhancer whereas the oral spray may comprise Peppermint oil as a flavor enhancer. It will be appreciated that different components or combinations of components may be provided for distinct nasal and oral sprays as suitable in consideration of the risk of irritation, the advantages to flavor and smell, and/or the ability of the sprays to be retained as desired in the respective cavities.

The antimicrobial composition may comprise one or more preservatives, such as potassium sorbate. While potassium sorbate has been described, it will be appreciated that other preservatives or combinations thereof may be used, including benzalkonium chloride, propanediol, antimicrobial peptides, or otherwise. The active ingredients, i.e. *Hypericum* and Neem oils and omega 3 PUFAs also synergistically provide preservative protection.

It has been surprisingly found that the combination of active ingredients, i.e. *Hypericum* and Neem oils and omega 3 PUFAs, is sensitive to temperature, and that providing the *Hypericum* and Neem oils in at least a v/v proportion of 60% preserves the efficacy of the antimicrobial composition despite temperature fluctuations. It further has been surprisingly found that providing an antimicrobial composition of *Hypericum* and Neem oils with omega 3 PUFAs in which the Neem oil is provided in much smaller proportions than the *Hypericum* oil—for example a *Hypericum*: Need v/v ratio of greater than or equal to 10:1, in embodiments greater than or equal to 100:1, in embodiments greater than or equal to 500:1, in embodiments greater than or equal to 1000:1, in embodiments greater than or equal to 1200:1—the broad-spectrum efficacy of the antimicrobial composition as well as the temperature stability are maintained.

Figure 8:
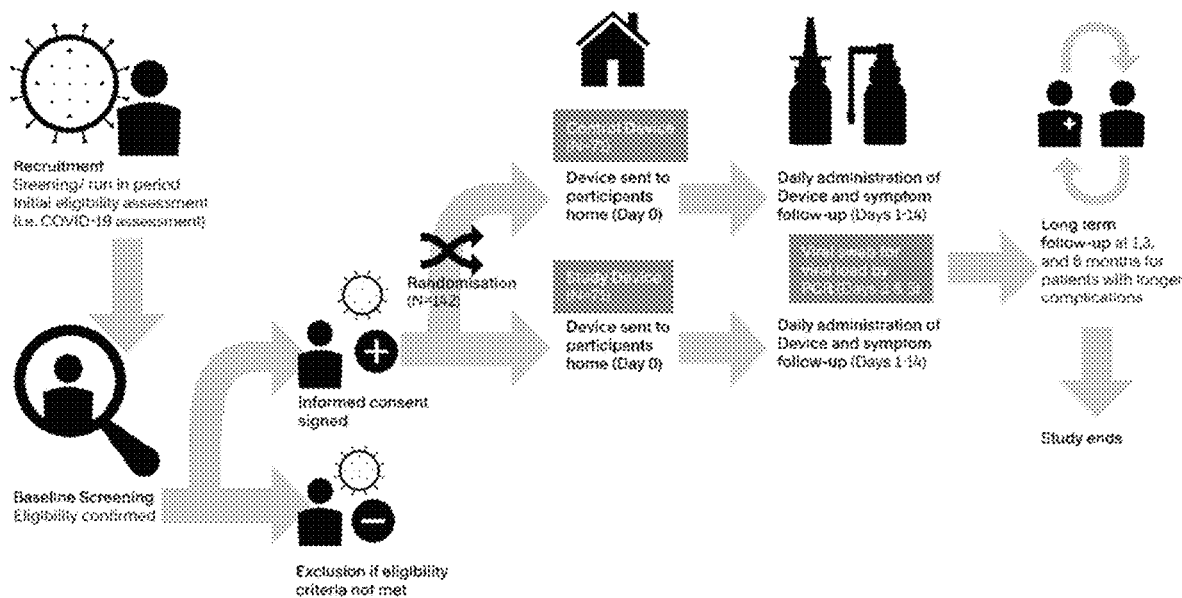

Turning now to FIG. 8, a diagram of an ongoing human subject study is shown. The human subject study includes recruiting subjects to determine eligibility. This may include, for example, a COVID-19 test to determine whether a potential subject is currently infected with COVID or has antibodies suggesting a recent infection with COVID-19. After a baseline screening step, eligibility is confirmed, with eligible subjects enrolled and informed consent obtained, and ineligible subjects excluded, for example if the subjects are already infected or have been infected previously with COVID-19. The ongoing study includes 142 subjects randomized to a control device (71 subjects) and to the study device (71 subjects).

The subjects in both the control device group and study device group receive a daily administration and symptom follow-up for 14 days, with a viral swab for viral load by polymerase chain reaction (PCR) test performed on days 3 and 5. The study further includes long-term follow-up at 1, 3, and 6 months for patients with longer complications.

Figures 9, 10:
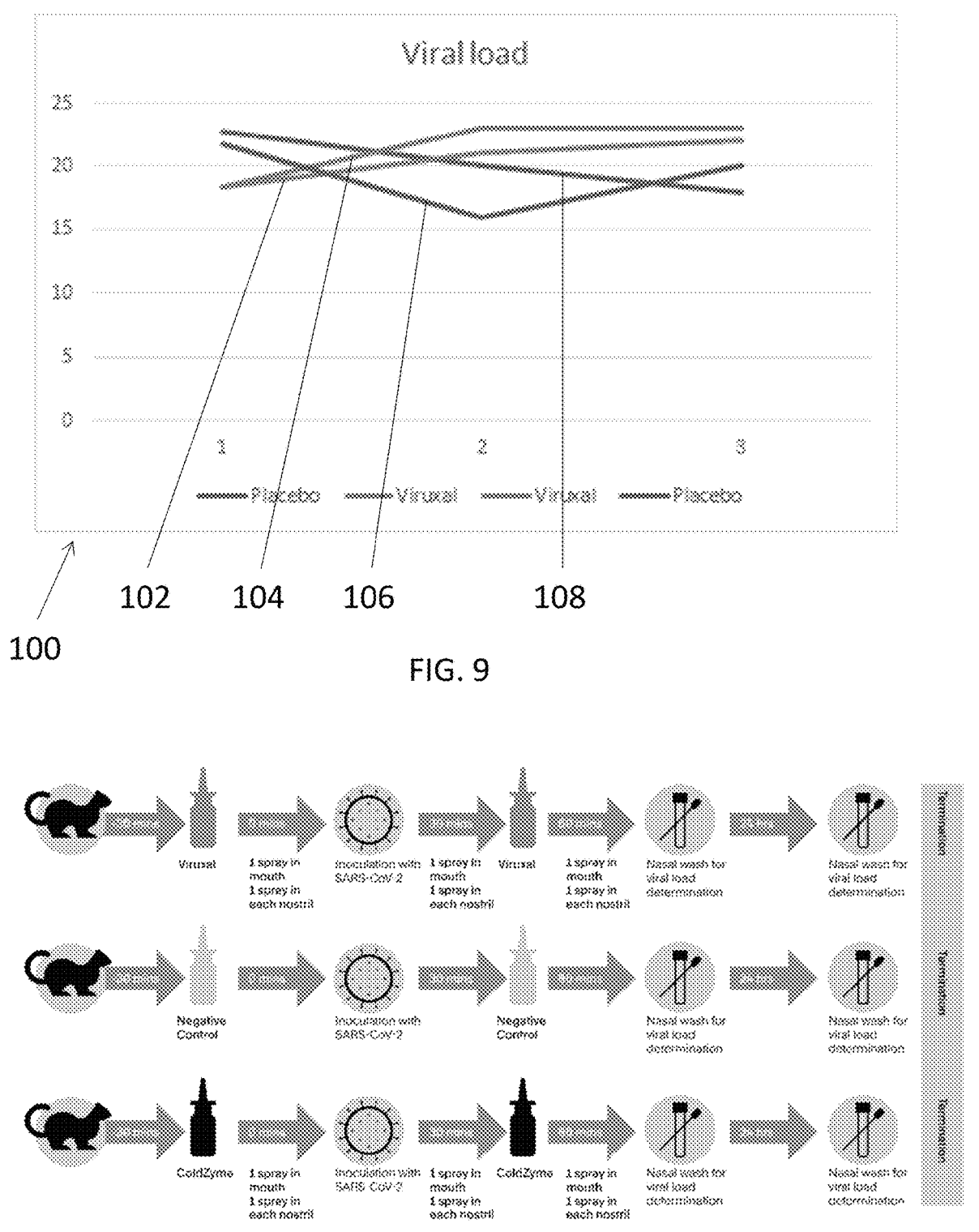

FIG. 9 shows preliminary data from four subjects of the ongoing human subject study. A graph 100 shows a first subject 102 and a second subject 104 subjected to an antimicrobial solution according to an embodiment, with a third subject 106 and a fourth subject 108 subjected to a control solution, with the cycle threshold (Ct) values charted on the y-axis and the sample time on the x-axis, specifically wherein 1 corresponds to day 0, 2 corresponds to day 3, and 3 corresponds to day 5. A higher Ct value indicates a decrease in the viral load. As seen, the first and second subjects 102, 104 experience a reduction in viral load compared to the third and fourth control subjects 106, 108.

FIG. 10 shows a diagram of planned animal subject study. As seen, the animal subject study involves three different groups of subjects: a first group involving exposure to an antimicrobial solution according to an embodiment, a second group including a negative control, and a third group involving exposure to ColdZyme® Mouth Spray available from Enzymatica AB of Lund, Sweden. The animal subjects may be ferrets, mice, monkeys, Syrian hamsters, or otherwise. For the antimicrobial solution and ColdZyme® groups, the solutions are administered with one spray in the mouth and one spray in each nostril. All three groups are then inoculated with SARS-CoV-2.

30 minutes after inoculation, the antimicrobial solution and ColdZyme® groups receive another spray in the mouth and one spray in each nostril. Another 60 minutes after inoculation, the antimicrobial solution and ColdZyme® groups receive another spray in the mouth and one spray in each nostril. All three groups then (90 minutes after inoculation) receive a nasal wash for viral load determination. 24 hours later, another nasal wash for viral determination is performed. While exposure to SARS-CoV-2 is described, the trial may likewise include enveloped viruses such as coronaviruses, RSV, influenza, non-enveloped viruses such as rhinoviruses, or other microbes. In this test or in other tests relating to the antimicrobial compositions of the disclosed embodiments, the antimicrobial compositions may be assessed as a prophylaxis against one or more microbes such as particular viruses.

Figure 11:
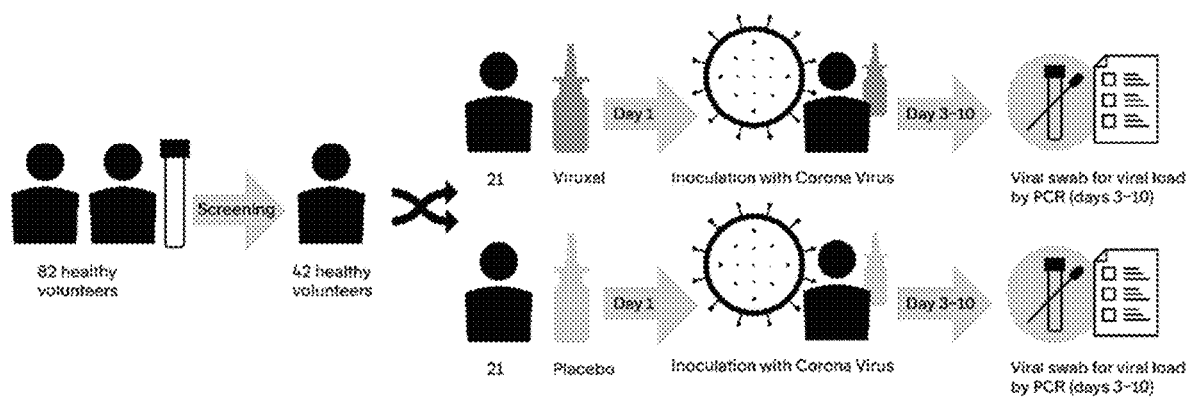

FIG. 11 shows a diagram of a planned human subject study. The planned human subject study involves recruiting 82 healthy volunteers to be screened and narrowed to a population of 42 healthy volunteers. The selected volunteers are to be divided into a test group (receiving an antimicrobial solution according to an embodiment) and a control group, with each group having 21 participants. On day 1 of the study, the test group receives the antimicrobial solution, and both groups are inoculated with SARS-CoV-2. On each of days 3-10, the subjects are swabbed to determined viral load using a PCR test.

Because the active components of the disclosed antimicrobial sprays are generally safe for ingestion and are cleared by the FDA, and other international food safety organizations, in the concentrations provided, the disclosed formulations can beneficially be provided in an over-the-counter manner for prophylactic and/or symptomatic use. As such, the disclosed therapeutic compositions can be easily and widely distributed. This can beneficially reduce the spread of contagious upper respiratory tract viral pathogens within a community and can be useful in combatting epidemic and/or pandemic outbreaks such as COVID-19 or similar.

By providing an antimicrobial solution according to the disclosed embodiments, the problem of existing treatments being poorly adapted to preventing and addressing microbial and viral infections such as the novel coronavirus are advantageously addressed. The solution embodiments of the disclosure provide an antimicrobial solution that has broad-spectrum effectiveness against Gram-positive and Gram-negative bacteria, enveloped and non-enveloped viruses, and other microbes.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

It is to be understood that not necessarily all objects or advantages may be achieved under an embodiment of the disclosure. Those skilled in the art will recognize that the exoskeletons and methods for making the same may be embodied or carried out in a manner that achieves or optimizes one advantage or group of advantages as taught herein without achieving other objects or advantages as taught or suggested herein.

The skilled artisan will recognize the interchangeability of various disclosed features. Besides the variations described herein, other known equivalents for each feature can be mixed and matched by one of ordinary skill in this art to provide an antimicrobial solution under principles of the present disclosure. The skilled artisan will understand that the features described herein may be adapted to other types of solutions.

Although this disclosure describes certain exemplary embodiments and examples of an antimicrobial solution, it will be understood by those skilled in the art that the present disclosure extends beyond the specifically disclosed antimicrobial solution embodiments to other alternative embodiments and/or uses of the disclosure and obvious modifications and equivalents thereof. It is intended that the present disclosure should not be limited by the disclosed embodiments described above and may be extended to other applications that may employ the features described herein.

What is claimed is:

1. An antimicrobial solution, comprising:
   an extract of the plant *Hypericum* spp. in a volumetric proportion of 2.5% to 60% (v/v) of a total volume of the antimicrobial solution;
   Neem oil;
   one or more pharmaceutically acceptable carriers, additives, and/or diluents that configure the antimicrobial solution to form a barrier film in a nasal mucosa, oral mucosa, and/or oropharyngeal mucosa of a subject; and
   polyunsaturated fatty acids (PUFAs).

2. The antimicrobial solution of claim 1, wherein the Neem oil includes between 6-16% of linoleic acid, 25-54% of oleic acid, 16-33% of palmitic acid, and 9-24% of stearic acid.

3. The antimicrobial solution of claim 1, wherein the extract of the plant *Hypericum* spp. comprises extract from *Hypericum perforatum*.

4. The antimicrobial solution of claim 1, wherein the extract of the plant *Hypericum* spp. comprises hypericin as a main active ingredient.

5. The antimicrobial solution of claim 1, wherein the antimicrobial solution comprises the Neem oil in a volumetric proportion of at most 10% (v/v) of the total volume of the antimicrobial solution.

6. The antimicrobial solution of claim 1, wherein the extract of the plant *Hypericum* spp. and the Neem oil are provided in a volume ratio of greater than 100:1.

7. The antimicrobial solution of claim 1, wherein the antimicrobial solution comprises the extract of the plant *Hypericum* spp. in a volumetric proportion of at most 5% (v/v) of the total volume of the antimicrobial solution.

8. The antimicrobial solution of claim 1, wherein the antimicrobial solution comprises the extract of the plant *Hypericum* spp. in a volumetric proportion of at most 10% (v/v) of the total volume of the antimicrobial solution.

9. An antimicrobial solution, comprising:
   an extract of the plant *Hypericum* spp. in a volumetric proportion of 2.5% to 60% (v/v) of a total volume of the antimicrobial solution;
   Neem oil;
   one or more pharmaceutically acceptable carriers, additives, and/or diluents that configure the antimicrobial solution to form a barrier film in a nasal mucosa, oral mucosa, and/or oropharyngeal mucosa of a subject; and
   carrageenan.

10. The antimicrobial solution of claim 1, further comprising a chlorhexidine.

11. An antimicrobial solution, comprising:
    an extract of the plant *Hypericum* spp. in a volumetric proportion of 2.5% to 60% (v/v) of a total volume of the antimicrobial solution;
    Neem oil; and
    one or more pharmaceutically acceptable carriers, additives, and/or diluents that configure the antimicrobial solution to form a barrier film in a nasal mucosa, oral mucosa, and/or oropharyngeal mucosa of a subject,
    wherein the pharmaceutically acceptable carrier comprises glycerol.

12. The antimicrobial solution of claim 1, wherein the one or more pharmaceutically acceptable additives includes a flavor-enhancing additive.

13. The antimicrobial solution of claim 1, wherein the antimicrobial solution comprises the one or more pharmaceutically acceptable carriers, additives, and/or diluents in a volumetric proportion of at least 10% (v/v) of the total volume of the antimicrobial solution.

14. The antimicrobial solution of claim 1, wherein the antimicrobial solution comprises the one or more pharmaceutically acceptable carriers, additives, and/or diluents in a volumetric proportion of at least 33% (v/v) of the total volume of the antimicrobial solution.

15. The antimicrobial solution of claim 1, wherein the antimicrobial solution is in the form of a lotion, a hydrogel, a mouth spray, and/or a nasal spray.

16. The antimicrobial solution of claim 15, wherein the antimicrobial solution is in the form of a mouth spray, and/or a nasal spray, and wherein the antimicrobial solution is delivered in 50 µL-200 µL doses per actuation of the mouth spray and/or the nasal spray.

17. A method of treatment or prophylaxis, comprising:
    providing an antimicrobial solution that includes
        an extract of the plant *Hypericum* spp. in a volumetric proportion of 2.5% to 60% (v/v) of a total volume of the antimicrobial solution,
        Neem oil,
        one or more pharmaceutically acceptable carriers, additives, and/or diluents that configure the antimicrobial solution to form a barrier film in a nasal mucosa, oral mucosa, and/or oropharyngeal mucosa of a subject, and
        polyunsaturated fatty acids (PUFAs); and
    administering the antimicrobial solution to a mouth and/or nose of a subject.

18. An antimicrobial solution, comprising:
    an extract of the plant *Hypericum* spp. in a volumetric proportion of 2.5% to 60% (v/v) of a total volume of the antimicrobial solution;
    Neem oil; and
    one or more pharmaceutically acceptable carriers, additives, and/or diluents that configure the antimicrobial solution to form a barrier film in a nasal mucosa, oral mucosa, and/or oropharyngeal mucosa of a subject;
    wherein the one or more pharmaceutically acceptable additives includes a flavor-enhancing additive, and
    wherein the flavor-enhancing additive includes menthol.

19. The antimicrobial solution of claim 1, wherein the one or more pharmaceutically acceptable carriers, additives, and/or diluents configure the antimicrobial solution to form a non-water soluble barrier film in the nasal mucosa, oral mucosa, and/or oropharyngeal mucosa of the subject.

20. The antimicrobial solution of claim 1, wherein the antimicrobial solution is in the form of a mouth spray and/or a nasal spray.

21. The antimicrobial solution of claim 1, wherein the one or more pharmaceutically acceptable carriers, additives, and/or diluents include glycerol, water, and an emulsifier.

22. The method of claim 17, comprising administering the antimicrobial solution to the nose of the subject.

23. The antimicrobial solution of claim 1, wherein the antimicrobial solution comprises the extract of the plant *Hypericum* spp. in a volumetric proportion of 5% to 60% (v/v) of a total volume of the antimicrobial solution.

24. The antimicrobial solution of claim 1, wherein the antimicrobial solution comprises the extract of the plant *Hypericum* spp. in a volumetric proportion of 5% to 50% (v/v) of a total volume of the antimicrobial solution.

25. The antimicrobial solution of claim 1, wherein the antimicrobial solution comprises the extract of the plant *Hypericum* spp. in a volumetric proportion of 10% to 50% (v/v) of a total volume of the antimicrobial solution.

26. The antimicrobial solution of claim 1, wherein the antimicrobial solution comprises the extract of the plant *Hypericum* spp. in a volumetric proportion of 5% to 30% (v/v) of a total volume of the antimicrobial solution.

27. The antimicrobial solution of claim 1, wherein the antimicrobial solution comprises the extract of the plant *Hypericum* spp. in a volumetric proportion of 5% to 25% (v/v) of the total volume of the antimicrobial solution.

28. The antimicrobial solution of claim 1, wherein the antimicrobial solution comprises the polyunsaturated fatty acids (PUFAs) in a volumetric proportion of 5% to 80% (v/v) of the total volume of the antimicrobial solution.

29. The antimicrobial solution of claim 1, wherein the antimicrobial solution comprises the polyunsaturated fatty acids (PUFAs) in a volumetric proportion of 5% to 50% (v/v) of the total volume of the antimicrobial solution.

30. The antimicrobial solution of claim 1, wherein the antimicrobial solution comprises the polyunsaturated fatty acids (PUFAs) in a volumetric proportion of 10% to 50% (v/v) of the total volume of the antimicrobial solution.

31. The antimicrobial solution of claim 2, wherein the extract of the plant *Hypericum* spp. and the Neem oil are provided in a volume ratio of greater than 10:1.

32. The antimicrobial solution of claim 2, wherein the extract of the plant *Hypericum* spp. and the Neem oil are provided in a volume ratio of greater than 1000:1.

33. The antimicrobial solution of claim 1, wherein the antimicrobial solution comprises chlorhexidine in an amount of 0.05% to 0.2% (w/v) of the antimicrobial solution.

34. The antimicrobial solution of claim 9, wherein the antimicrobial solution comprises the carrageenan in an amount of 5% to 20% (w/v) of the antimicrobial solution.

\* \* \* \* \*